(12) United States Patent
Ono

(10) Patent No.: US 10,474,669 B2
(45) Date of Patent: Nov. 12, 2019

(54) CONTROL APPARATUS, CONTROL METHOD AND COMPUTER PROGRAM

(71) Applicant: SONY CORPORATION, Tokyo (JP)

(72) Inventor: Junya Ono, Kanagawa (JP)

(73) Assignee: SONY CORPORATION, Tokyo (JP)

(*) Notice: Subject to any disclaimer, the term of this patent is extended or adjusted under 35 U.S.C. 154(b) by 146 days.

(21) Appl. No.: 15/313,817

(22) PCT Filed: Feb. 4, 2016

(86) PCT No.: PCT/JP2016/053420
§ 371 (c)(1),
(2) Date: Nov. 23, 2016

(87) PCT Pub. No.: WO2016/158005
PCT Pub. Date: Oct. 6, 2016

(65) Prior Publication Data
US 2017/0206243 A1     Jul. 20, 2017

(30) Foreign Application Priority Data

Mar. 31, 2015   (JP) ................ 2015-072406

(51) Int. Cl.
*G06F 16/30* (2019.01)
*G06F 16/242* (2019.01)
(Continued)

(52) U.S. Cl.
CPC ............ *G06F 16/243* (2019.01); *G06F 3/013* (2013.01); *G06F 3/017* (2013.01); *G06F 3/0304* (2013.01); *G06F 3/038* (2013.01); *G06F 3/04842* (2013.01); *G06F 3/04883* (2013.01); *G06F 3/167* (2013.01); *G06F 16/00* (2019.01);
(Continued)

(58) Field of Classification Search
CPC ............... G06F 17/30; G06F 17/30401; G06F 17/30654
See application file for complete search history.

(56) References Cited

U.S. PATENT DOCUMENTS 8,768,707 B2    7/2014 Mozer
2007/0136262 A1*  6/2007 Dettinger .......... G06F 17/30587
(Continued)

FOREIGN PATENT DOCUMENTS

EP        2675180 A2     12/2013
WO   WO 2014/159472 A2  10/2014

OTHER PUBLICATIONS

Article entitled "How to use Google Alters for Quick and Easy Domain Alerts", by Gray, dated Jun. 2, 2010.*

(Continued)

*Primary Examiner* — Mahesh H Dwivedi
(74) *Attorney, Agent, or Firm* — Paratus Law Group, PLLC

(57) ABSTRACT

There is provided a control apparatus through which it is possible to present a response to a question about content that is uttered by the user while viewing the content to the user who asked the question in an appropriate form, the control apparatus including a control unit configured to perform control such that details of a response generated for a query about content that is output to at least one user from the user and a target to which the response is output are decided.

23 Claims, 25 Drawing Sheets

(51) Int. Cl.
  *G06F 16/2457* (2019.01)
  *G10L 15/18* (2013.01)
  *G10L 15/22* (2006.01)
  *G06F 3/01* (2006.01)
  *G06F 16/00* (2019.01)
  *G06F 16/332* (2019.01)
  *G06F 3/03* (2006.01)
  *G06F 3/038* (2013.01)
  *G06F 3/0488* (2013.01)
  *G06F 3/0484* (2013.01)
  *G06F 3/16* (2006.01)

(52) U.S. Cl.
  CPC .... *G06F 16/24578* (2019.01); *G06F 16/3329* (2019.01); *G10L 15/1815* (2013.01); *G10L 15/22* (2013.01); *G06F 2203/0381* (2013.01)

(56) References Cited

U.S. PATENT DOCUMENTS

| | | | | |
|---|---|---|---|---|
| 2009/0109126 | A1* | 4/2009 | Stevenson | B60K 37/00 345/4 |
| 2009/0113475 | A1* | 4/2009 | Li | G06F 17/30817 725/39 |
| 2009/0240665 | A1* | 9/2009 | Choi | H04L 29/06027 |
| 2010/0094866 | A1* | 4/2010 | Cuttner | G06F 17/30035 707/723 |
| 2010/0199294 | A1* | 8/2010 | Choi | H04N 7/17318 725/13 |
| 2010/0325140 | A1* | 12/2010 | Hubner | G06F 17/30864 707/769 |
| 2011/0282906 | A1* | 11/2011 | Wong | G06F 17/30831 707/780 |
| 2013/0104172 | A1* | 4/2013 | Lee | G06F 17/30967 725/60 |
| 2013/0262501 | A1* | 10/2013 | Kuchmann-Beauger | G06F 17/30958 707/769 |
| 2013/0297319 | A1* | 11/2013 | Kim | G10L 15/22 704/275 |
| 2013/0311506 | A1* | 11/2013 | Taubman | G06F 17/30979 707/769 |
| 2013/0339031 | A1 | 12/2013 | Yoon et al. | |
| 2014/0018049 | A1* | 1/2014 | Cannon | H04W 4/16 455/414.1 |
| 2014/0082094 | A1* | 3/2014 | Bilgen | G06Q 50/01 709/206 |
| 2014/0232638 | A1* | 8/2014 | Choi | G06F 3/013 345/156 |
| 2014/0316764 | A1* | 10/2014 | Ayan | G10L 15/24 704/9 |
| 2014/0358890 | A1* | 12/2014 | Chen | G06F 17/30867 707/710 |
| 2014/0358901 | A1* | 12/2014 | Kim | H04N 21/4828 707/722 |
| 2015/0088998 | A1* | 3/2015 | Isensee | H04L 51/02 709/206 |
| 2015/0233715 | A1* | 8/2015 | Xu | H04W 4/21 701/408 |
| 2015/0261859 | A1* | 9/2015 | Isensee | G06F 17/30864 707/723 |
| 2015/0347461 | A1 | 12/2015 | Moon et al. | |
| 2016/0239489 | A1* | 8/2016 | Cunico | G09B 7/00 |
| 2016/0328467 | A1* | 11/2016 | Zou | G06F 17/2735 |

OTHER PUBLICATIONS

Jul. 31, 2018, European Search Report issued for related EP Application No. 16771889.9.

* cited by examiner

FIG. 24
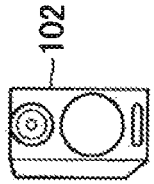

CONTROL APPARATUS, CONTROL METHOD AND COMPUTER PROGRAM

CROSS REFERENCE TO PRIOR APPLICATION

This application is a National Stage Patent Application of PCT International Patent Application No. PCT/JP2016/053420 (filed on Feb. 4, 2016) under 35 U.S.C. § 371, which claims priority to Japanese Patent Application No. 2015-072406 (filed on Mar. 31, 2015), which are all hereby incorporated by reference in their entirety.

TECHNICAL FIELD

The present disclosure relates to a control apparatus, a control method and a computer program.

BACKGROUND ART

Technology in which, in response to a question from a user, a response including an answer to the question is generated, and the generated response is presented to the user who asked the question is disclosed (for example, refer to Patent Literature 1).

CITATION LIST

Patent Literature

Patent Literature 1 JP 2014-225766A

SUMMARY OF INVENTION

Technical Problem

When a user has a question about content while viewing the content, the user would like to easily ask the question without stopping viewing the content and obtain a response to the question in an appropriate form.

Thus, the present disclosure proposes a control apparatus, a control method and a computer program which are novel and improved and through which it is possible to present a response to a question about content that is uttered by the user while viewing the content to the user who asked the question in an appropriate form.

Solution to Problem

According to the present disclosure, there is provided a control apparatus including: a control unit including a control unit configured to perform control such that details of a response generated for a query about content that is output to at least one user from the user, a target to which the response is output and a timing at which the response is output are decided.

According to the present disclosure, there is provided a control apparatus including: performing, by a computer, control such that details of a response generated for a query about content that is output to at least one user from the user, a target to which the response is output and a timing at which the response is output are decided.

According to the present disclosure, there is provided a computer program causing a computer to perform control such that details of a response generated for a query about content that is output to at least one user from the user, a target to which the response is output and a timing at which the response is output are decided.

Advantageous Effects of Invention

As described above, according to the present disclosure, it is possible to provide a control apparatus, a control method and a computer program which are novel and improved and through which it is possible to present a response to a question about content that is uttered by a user while viewing the content to the user who asked the question in an appropriate form.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is an explanatory diagram showing a use case example using the control apparatus 100 according to an embodiment of the present disclosure.

DESCRIPTION OF EMBODIMENT(S)

Figure 1:
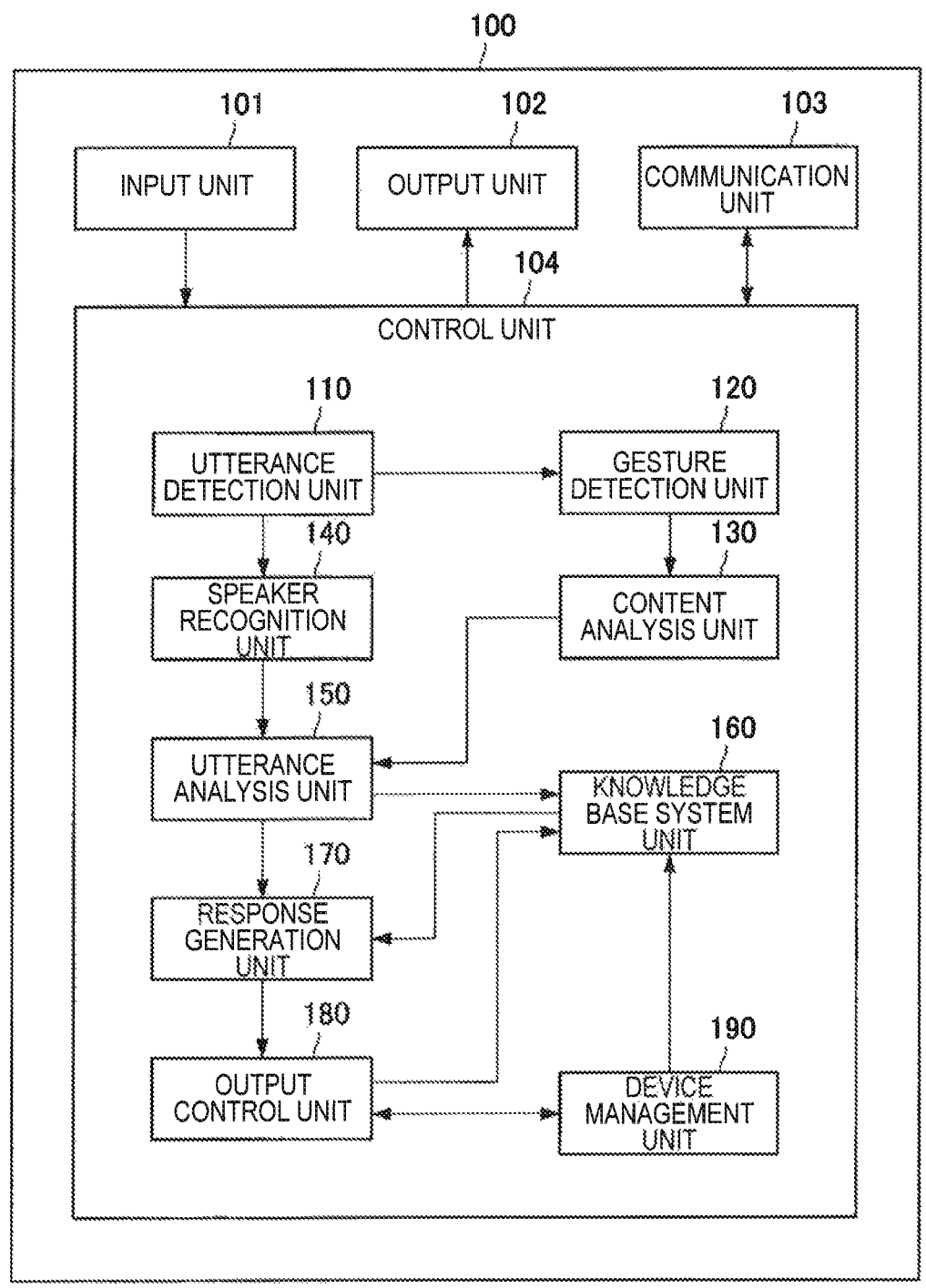
FIG. 1 is an explanatory diagram showing a functional configuration example of a control apparatus 100 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Embodiment of present disclosure
1.1. Background
1.2. Functional configuration example
1.3. Operation example
2. Hardware configuration example
3. Summary

1. Embodiment of Present Disclosure

1.1. Background

First, before an embodiment of the present disclosure is described in detail, the background of the embodiment of the present disclosure will be described.

While users have many chances to view video content such as TV programs and movies using a TV or a personal computer (PC), devices called wearable devices that are worn by users when used have been emerging in recent years. While wearable devices have various forms, for example, an eyeglass type and a watch type, a common point is that they have small screens. Therefore, when users view content using such wearable devices having a small screen, a case in which content is manipulated by speaking to the device without directly manipulating a screen is assumed. In addition, when the user speaks to the device, the number of utterances including ambiguous expressions using demonstratives such as "this" and "that" are assumed to increase.

On the other hand, a device through which it is possible to view content supporting a resolution of about 4000 pixels (horizontal)×2000 pixels (vertical) called a 4 K when the user views content using a TV is emerging. Further, content supporting a higher resolution of about 8000 pixels (horizontal)×4000 pixels (vertical) called an 8 K is expected to be upcoming. Therefore, cases in which pluralities of people such as families view content using a large screen are assumed to increase in the future. Even while a user views content using such a large screen, it is assumed that the user manipulates the content by speaking to the screen, and when the user speaks to the screen, utterances including ambiguous expressions using demonstratives such as "this" and "that" are assumed to increase.

In any case, when a user views content and wants to know an answer to a question about the content, he or she temporarily stops viewing the content and searches for the answer using a device that is used to view the content or a device that is not used to view the content, which interferes with the user's viewing of the content. Therefore, when the user views content and wants to know an answer to a question about the content, it is preferable for the user to obtain a response to the question without stopping viewing the content.

In addition, as described above, when the user speaks to the device, utterances including ambiguous expressions using demonstratives such as "this" and "that" are assumed to increase. Accordingly, it is preferable to interpret such ambiguous expression accurately and present a response to the user. That is, when the user views contents and asks "Who is this person?" it is necessary to accurately interpret what the user's question is about and the kind of response to be generated for the question.

In addition, as described above, cases in which pluralities of people such as families view content using a large screen are assumed to increase in the future. In such cases, it is necessary to accurately detect which user utters a question and return a response to the utterance to the user who has uttered it.

Here, in view of the above-described background, the present discloser has conducted extensive research on technology through which, when a user views content, a response to a question uttered about the content can be presented to the user who has uttered the question in an appropriate form. As a result, as will be described below, the present discloser has devised technology through which, when a user views content, an intention of a question uttered regarding the content is analyzed and a response to the question can be presented to the user who has uttered the question in an appropriate form.

The background of the embodiment of the present disclosure has been described above. Next, the embodiment of the present disclosure will be described in detail.

1.2. Functional Configuration Example

First, a functional configuration example of a control apparatus 100 according to an embodiment of the present disclosure is shown. FIG. 1 is an explanatory diagram showing a functional configuration example of the control apparatus 100 according to an embodiment of the present disclosure. FIG. 1 shows a functional configuration example of the control apparatus 100 configured to receive a question from the user who views content and generate a response to the question. Hereinafter, the functional configuration example of the control apparatus 100 according to an embodiment of the present disclosure will be described with reference to FIG. 1.

As shown in FIG. 1, the control apparatus 100 according to an embodiment of the present disclosure includes an input unit 101, an output unit 102, a communication unit 103, and a control unit 104.

The input unit 101 receives an input from the user. In the present embodiment, the input unit 101 configured to receive a question from the user who views content that is output from the output unit 102 is provided in the control apparatus 100. The input unit 101 includes, for example, a microphone configured to collect voice of an utterance from the user, a camera configured to capture an image of a gesture of the user, a depth sensor configured to detect a distance from the input unit 101 to the user and the like. The input unit 101 transmits data generated by an input manipulation of the user to the control unit 104.

In the control apparatus 100 according to the present embodiment, when there are a plurality of users, in order to easily specify a user who has produced an utterance, a plurality of microphones are provided in the input unit 101, and beamforming according to the plurality of microphones may be performed.

The output unit 102 outputs data generated in the control unit 104. In the present embodiment, the output unit 102 outputs content to the user and outputs a response generated from the control unit 104 to a question about the content that is output from the user who has produced an utterance. The output unit 102 includes, for example, a display configured to display characters, images, and other visual information and a speaker configured to output voice.

The communication unit 103 performs communication of information with another apparatus. For example, the communication unit 103 performs communication of information with another apparatus based on control of the control unit 104, and can acquire information serving as a basis for a response to a question from the user from the other apparatus.

The control unit 104 controls operations of the control apparatus 100, and includes, for example, a central processing unit (CPU), a graphics processing unit (GPU), a read only memory (ROM), and a random access memory (RAM). In the present embodiment, the control unit 104 performs operation such that a response to a question input by the user using the input unit 101 is generated and a response from the output unit 102 is output in a form appropriate for the user.

As shown in FIG. 1, the control unit 104 included in the control apparatus 100 according to an embodiment of the present disclosure includes an utterance detection unit 110, a gesture detection unit 120, a content analysis unit 130, a speaker recognition unit 140, an utterance analysis unit 150, a knowledge base system unit 160, a response generation unit 170, an output control unit 180, and a device management unit 90.

The utterance detection unit 110 detects an utterance produced by the user toward the input unit 101. Then, when the utterance produced by the user is detected, the utterance detection unit 110 converts details of the utterance into text. In addition, when the utterance produced by the user is detected, the utterance detection unit 110 transmits voice of a section of the utterance to the subsequent speaker recognition unit 140.

Figure 2:
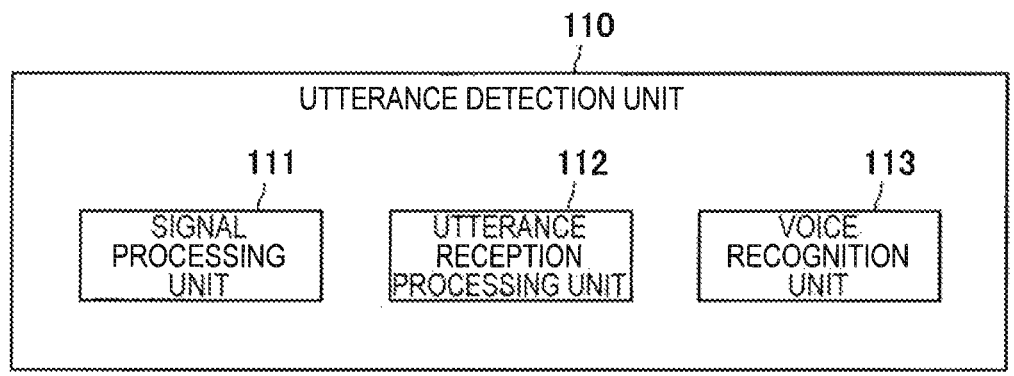
FIG. 2 is an explanatory diagram showing a functional configuration example of an utterance detection unit 110.

FIG. 2 is an explanatory diagram showing a functional configuration example of the utterance detection unit 110. As shown in FIG. 2, the utterance detection unit 110 includes a signal processing unit 111, an utterance reception processing unit 112, and a voice recognition unit 113.

In order to increase accuracy of voice recognition, the signal processing unit 111 performs signal processing of a voice signal transmitted from the input unit 101. For example, in order to increase accuracy of voice recognition in the far field, the signal processing unit 111 performs signal processing through which noise or reverberation is removed from the voice signal.

The utterance reception processing unit 112 performs a process of receiving the utterance produced by the user as the voice signal that underwent signal processing in the signal processing unit 111. The utterance reception processing unit 112 receives the utterance produced by the user and detects an utterance section of the user. In this manner, when the utterance produced by the user is received and the utterance section of the user is detected to limit an utterance part, it is possible to increase accuracy of recognition in the subsequent voice recognition unit 113. In addition, in this manner, when the utterance produced by the user is received and the utterance section of the user is detected to limit an utterance part, it is possible to limit a processing period of voice recognition in the subsequent voice recognition unit 113 and reduce power consumption.

The voice recognition unit 113 performs a voice recognition process in the utterance section of the user detected by the utterance reception processing unit 112, and converts voice into text. The process of converting voice into text is not limited to a specific process.

In a configuration such as that shown in FIG. 2, the utterance detection unit 110 can detect the utterance produced by the user and convert details uttered by the user into text.

The gesture detection unit 120 detects a gesture input by the user to the input unit 101. When the gesture of the user is detected, the gesture detection unit 120 can determine a part indicated by the user within content that is displayed on the output unit 102.

The content analysis unit 130 analyzes details of content that is displayed on the output unit 102. For example, the content analysis unit 130 analyzes a video and voice of the content that is displayed on the output unit 102 and transmits the analysis result to the utterance analysis unit 150. The content analysis unit 130 separates, for example, an image, voice, and text in the content and extracts a feature value corresponding to the separated data. Then, for example, the content analysis unit 130 converts a feature value of an image into a keyword, converts voice into text, and acquires a feature value of the text according to language analysis. In addition, for example, when metadata is appended to the content that is displayed on the output unit 102, the content analysis unit 130 analyzes details of the metadata and transmits the analysis result to the utterance analysis unit 150.

The speaker recognition unit 140 specifies a speaker who has produced an utterance toward the input unit 101. For example, the speaker recognition unit 140 specifies a direction in which the speaker produced the utterance, analyzes the voice of the utterance, and thus specifies the speaker.

Figure 3:
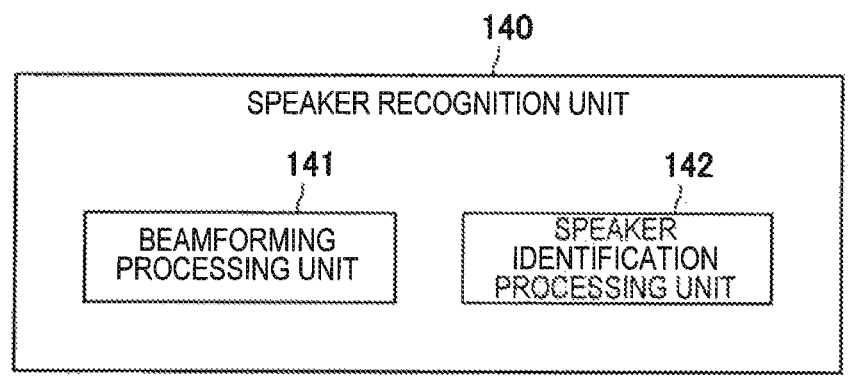
FIG. 3 is an explanatory diagram showing a functional configuration example of a speaker recognition unit 140.

FIG. 3 is an explanatory diagram showing a functional configuration example of the speaker recognition unit 140. As shown in FIG. 3, the speaker recognition unit 140 includes a beam forming processing unit 141 and a speaker identification processing unit 142.

The beamforming processing unit 141 specifies a direction in which speaker produced the utterance according to beam-forming using the plurality of microphones provided in the input unit 101.

The speaker identification processing unit 142 performs a process of specifying a person who produced an utterance. For example, the speaker identification processing unit 142 specifies a person in an utterance direction specified by the beamforming processing unit 141 according to a face recognition process of an image captured by the camera provided in the input unit 101. In addition, for example, the speaker identification processing unit 142 performs a process in which voice of an utterance is analyzed and a person who has produced the utterance is specified.

In a configuration such as that shown in FIG. 3, the speaker recognition unit 140 can predict a speaker who has produced an utterance toward the input unit 101 with high accuracy. A speaker specifying process performed by the speaker recognition unit 140 according to the present embodiment will be described in detail.

The utterance analysis unit 150 analyzes details of the utterance detected by the utterance detection unit 110. The utterance analysis unit 150 analyzes details of the utterance detected by the utterance detection unit 110 according to language analysis, context analysis (succession of utterance sentences), semantic analysis and the like. Then, the utterance analysis unit 150 analyzes details of the utterance detected by the utterance detection unit 110, and when the analysis result shows that details of the utterance include a question sentence, queries the knowledge base system unit 160.

Figure 4:
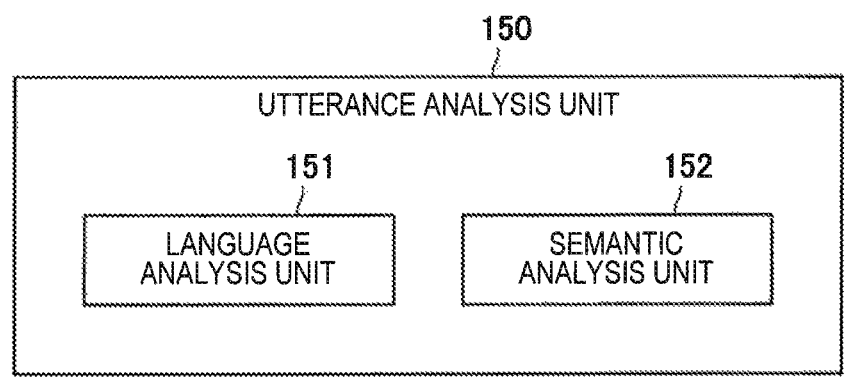
FIG. 4 is an explanatory diagram showing a functional configuration example of an utterance analysis unit 150.

FIG. 4 is an explanatory diagram showing a functional configuration example of the utterance analysis unit 150. As shown in FIG. 4, the utterance analysis unit 150 includes a language analysis unit 151 and a semantic analysis unit 152.

The language analysis unit 151 analyzes a structure of the text converted by the utterance detection unit 110. When the structure of the text converted by the utterance detection unit 110 is analyzed, the language analysis unit 151 can determine whether details of the utterance from the user include a question. When the structure of the text converted by the utterance detection unit 110 is analyzed, the language analysis unit 151 may perform context analysis. The context is analyzed, a previous utterance from the user is successively analyzed, and an expression omitted by the user or a demonstrative can be correctly normalized.

The semantic analysis unit 152 interprets an ambiguous expression included in the text converted by the utterance detection unit 110 and interprets an intention of the utterance from the user. The semantic analysis unit 152 queries the knowledge base system unit 160 and thus interprets the ambiguous expression.

In a configuration such as that shown in FIG. 4, the utterance analysis unit 150 analyzes details of the utterance detected by the utterance detection unit 110, and can detect a meaning of the utterance from the user.

The knowledge base system unit 160 maintains a graph structured database of, for example, general knowledge, user-specific knowledge, and device-specific knowledge, searches the database, and performs reasoning of the ambiguous expression to interpret the ambiguous expression. The knowledge base system unit 160 may reflect a preference of the user when the ambiguous expression is interpreted.

The knowledge base system unit 160 generates a response to a question from the utterance analysis unit 150. In the present embodiment, the response generated by the knowledge base system unit 160 is also referred to as response base parameters. The response base parameters generated by the knowledge base system unit 160 are transmitted to the response generation unit 170 and serve as a basis for the response for the user generated in the response generation unit 170.

Figure 5:
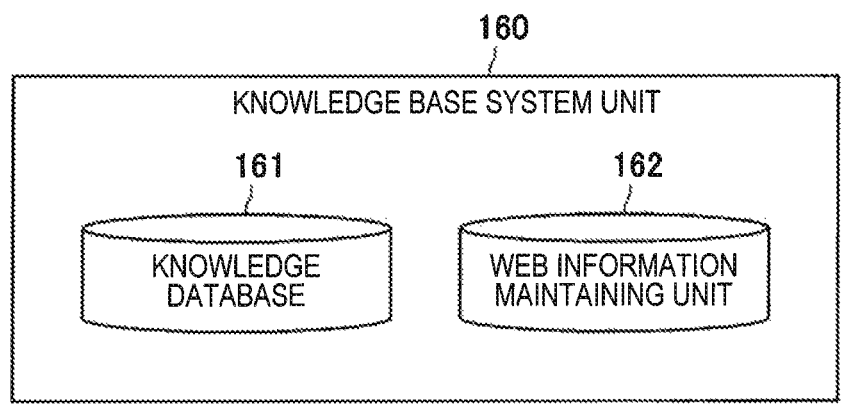
FIG. 5 is an explanatory diagram showing a functional configuration example of a knowledge base system unit 160.

FIG. 5 is an explanatory diagram showing a functional configuration example of the knowledge base system unit 160. As shown in FIG. 5, the knowledge base system unit 160 includes a knowledge database 161 and a WEB information maintaining unit 162.

The knowledge database 161 is a graph structured database of general knowledge, user-specific knowledge, and device-specific knowledge. In addition, the WEB information maintaining unit 162 collects information provided on the Internet and is a graph structured database of the information.

In a configuration such as that shown in FIG. 5, the knowledge base system unit 160 can generate a response to a question from the utterance analysis unit 150. In addition, in a configuration such as that shown in FIG. 5, the knowledge base system unit 160 can analyze an intention of the user in the ambiguous expression in the utterance analysis unit 150. Generation of a response and a process of analyzing an intention of the user in the ambiguous expression using the knowledge base system unit 160 will be described below.

The response generation unit 170 generates a response (such as a response sentence, a response display, or response voice) serving as a base based on the response base parameters obtained from the knowledge base system unit 160. In the response serving as a base generated by the response generation unit 170, an output timing of the response and details of the response are controlled by the output control unit 180.

For the response serving as a base generated by the response generation unit 170, the output control unit 180 controls an output timing and details of a response to be output.

Figure 6:
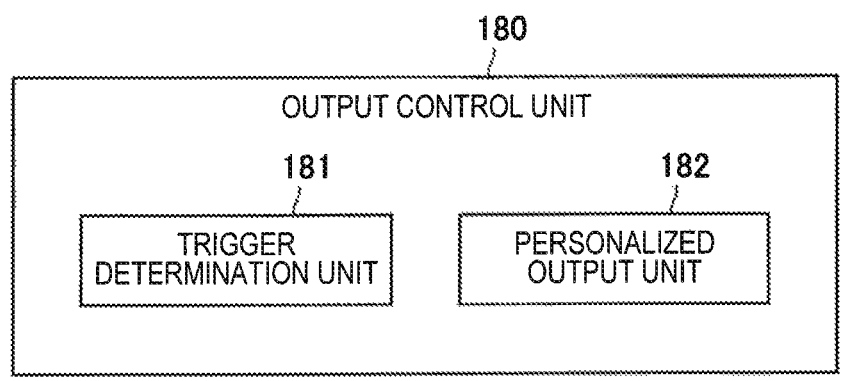
FIG. 6 is an explanatory diagram showing a functional configuration example of an output control unit 180.

FIG. 6 is an explanatory diagram showing a functional configuration example of the output control unit 180. As shown in FIG. 6, the output control unit 180 includes a trigger determination unit 181 and a personalized output unit 182.

The trigger determination unit 181 manages reproduction and stopping of content and determines an output timing of a response. The control apparatus 100 according to the present embodiment has two types of modes including a mode in which a response is output in real time and a mode in which a response is output when predetermined conditions are satisfied. The mode in which a response is output in real time is referred to as a real time mode, and the mode in which a response is output when predetermined conditions are satisfied is referred to as a bookmark mode. The predetermined conditions that the trigger determination unit 181 uses may include, for example, a condition that content that is output be in a predetermined state or, for example, a condition that a predetermined time arrive. The predetermined state of content that is output may be, for example, a timing at which the content ends or a timing at which the content transitions to a commercial when it is a TV program. The timing at which content ends includes both a timing at which content is reproduced to the end and a timing at which the user explicitly ends reproduction of content. The predetermined time includes both a time that has relatively elapsed from a content end time and a time unrelated to the end of content. When a response is output using a condition that a predetermined time arrive, a state in which no content is output may be added to the predetermined conditions that the trigger determination unit 181 uses.

The personalized output unit 182 performs control such that, with respect to the response serving as a base generated by the response generation unit 170, details are optimized and output according to an interest level of the user who has uttered a question.

In a configuration such as that shown in FIG. 6, the output control unit 180 can control an output timing of the response serving as a base generated by the response generation unit 170. In addition, in a configuration such as that shown in FIG. 6, the output control unit 180 can control details to be output of the response serving as a base generated by the response generation unit 170.

The device management unit 190 manages a device to which the output control unit 180 outputs a response and selects a device that is appropriate to output the response.

Figure 7:
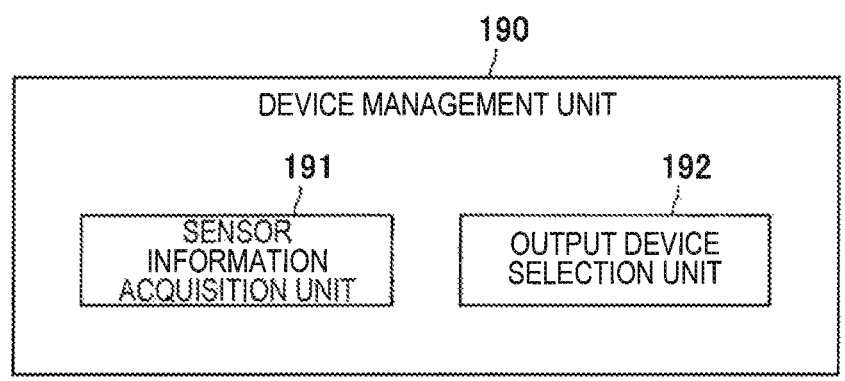
FIG. 7 is an explanatory diagram showing a functional configuration example of a device management unit 190.

FIG. 7 is an explanatory diagram showing a functional configuration example of the device management unit 190.

As shown in FIG. 7, the device management unit 190 includes a sensor information acquisition unit 191 and an output device selection unit 192.

The sensor information acquisition unit 191 acquires information transmitted from a sensor of the input unit 101. The information of the sensor acquired from the sensor information acquisition unit 191 is used for a process of the output device selection unit 192 selecting a device that is appropriate to output the response.

The output device selection unit 192 performs a process of selecting a device that is appropriate to output the response using the information of the sensor acquired from the sensor information acquisition unit 191. A process of the output device selection unit 192 selecting a device will be described below.

In a configuration such as that shown in FIG. 7, the device management unit 190 manages a device to which the output control unit 180 outputs a response and can select a device that is appropriate to output the response based on information transmitted from the sensor of the input unit 101.

While a form in which the input unit 101 and the output unit 102 are included in the control apparatus 100 is shown in the functional configuration example shown in FIG. 1, the present disclosure is not limited thereto. The input unit 101 and the output unit 102 may be provided in an apparatus that is different from that of the control unit 104.

The functional configuration example of the control apparatus 100 according to an embodiment of the present disclosure has been described above. In a configuration such as that shown in FIG. 1 to FIG. 7, the control apparatus 100 according to an embodiment of the present disclosure can understand an intention of a question uttered by the user with respect to content that is output and output a response to the question in a form appropriate for the user who asked the question.

The functional configuration example of the control apparatus 100 according to an embodiment of the present disclosure has been described above. Next, an operation example of the control apparatus 100 according to an embodiment of the present disclosure will be described.

1.3. Operation Example

Figure 8:
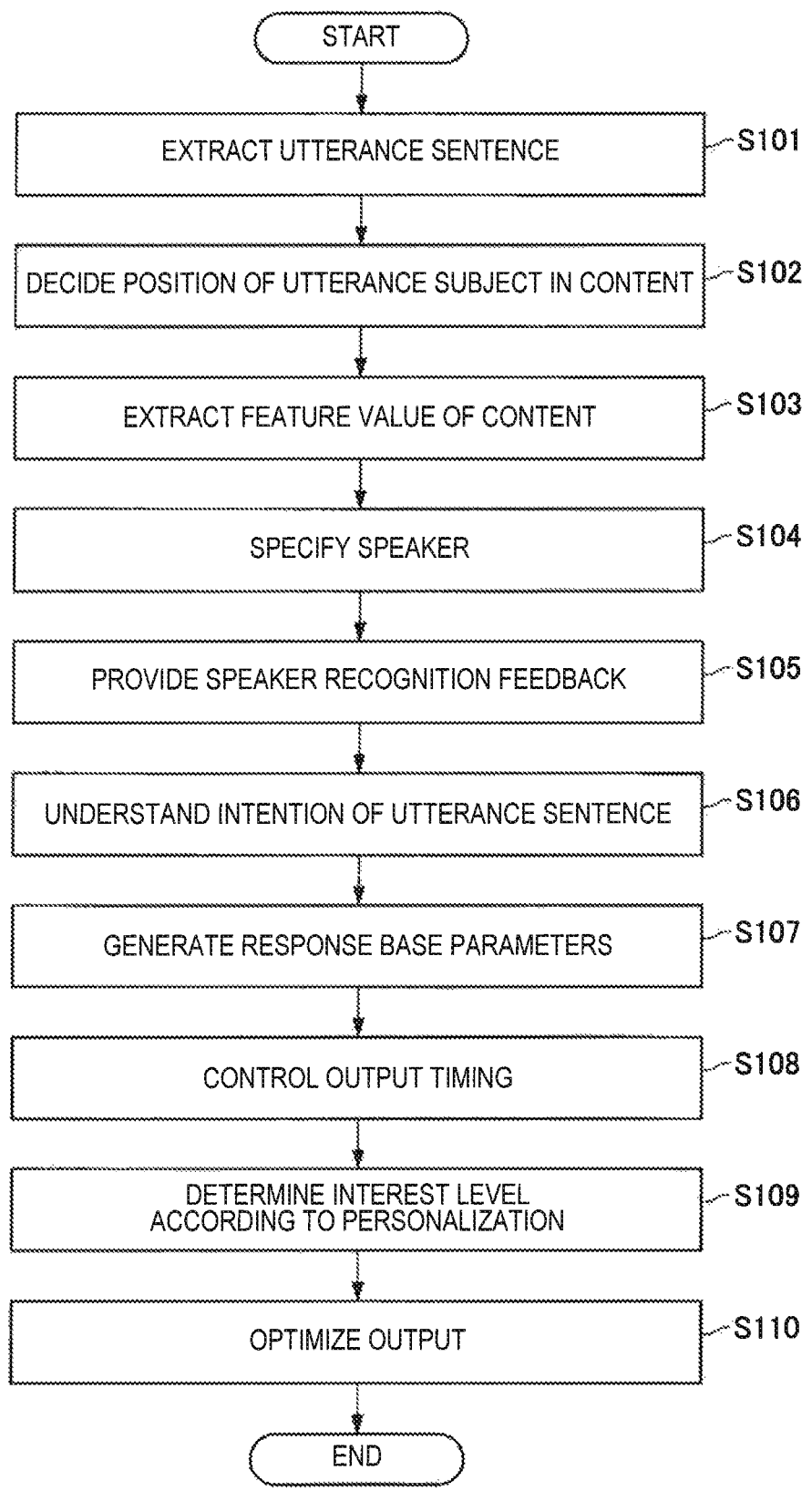
FIG. 8 is a flowchart showing an operation example of the control apparatus 100 according to an embodiment of the present disclosure.

FIG. 8 is a flowchart showing an operation example of the control apparatus 100 according to an embodiment of the present disclosure. FIG. 8 shows an operation example of the control apparatus 100 when an answer to a question uttered by the user with respect to content that is output is generated and a response to the question is output in a form appropriate for the user who asked the question. Hereinafter, an operation example of the control apparatus 100 according to an embodiment of the present disclosure will be described with reference to FIG. 8.

When the user produces an utterance toward the input unit 101 with respect to content that is output through the output unit 102, first, the control apparatus 100 extracts an utterance sentence (Step S101). The extraction of the utterance sentence in Step S101 is performed by, for example, the utterance detection unit 110.

When the utterance sentence is extracted, the control apparatus 100 detects, for example, a predetermined operation of the user, and may transition to an utterance reception state according to detection of the operation. When the state transitions to the utterance reception state according to detection of the operation, the control apparatus 100 can limit an utterance section, reduce a probability of noise being input when the utterance sentence is extracted and increase accuracy of voice recognition. In addition, when the state transitions to the utterance reception state according to detection of the operation, the control apparatus 100 can reduce power consumption since it is not always necessary to activate voice recognition.

A predetermined operation for transition to the utterance reception state may include, for example, a manipulation of a remote controller, a predetermined activation word, and a predetermined gesture. For example, the control apparatus 100 performs a voice recognition process in which a predetermined activation word is set in advance, and only the activation word is recognized. Then, when the activation word is recognized, the control apparatus 100 activates voice recognition and awaits an utterance of the user.

For example, the control apparatus 100 operates only a voice recognition function in which only a predetermined activation word is recognized and whose power consumption is low and when the predetermined activation word is recognized, may operate a voice recognition function in which all voice is recognized.

In addition, for example, when the state transitions to the utterance reception state according to recognition of the predetermined gesture, the control apparatus 100 detects the user's face, finger manipulation and line of sight using a camera, a depth sensor and the like. For example, when the user's face, finger, or line of sight that faces a specific part of a display area for a predetermined time is detected, the control apparatus 100 can transition to the utterance reception state.

The control apparatus 100 extracts the utterance sentence of the user in Step S101, and then performs a process of deciding a position of an utterance subject in content in which a position of the utterance subject of the user in the content that is output through the output unit 102 is decided (Step S102). The process of deciding a position of the utterance subject in the content in Step S102 is performed by, for example, the gesture detection unit 120.

For example, when the control apparatus 100 extracts the utterance sentence in Step S101, the utterance sentence "Who is the person on the left side of the screen?" could be extracted as a result. The control apparatus 100 can decide that the utterance subject is on the left side in the content from details of the utterance. In this manner, when the user designates a position in the content to some extent, the control apparatus 100 easily decides a position of the utterance subject in the content.

On the other hand, for example, when the control apparatus 100 extracts the utterance sentence in Step S101, the utterance sentence "Who is this person?" could be extracted as a result. If there is only one person in content that is output through the output unit 102 when the utterance is produced, it is easy to specify the subject. However, when there are a plurality of people in content that is output through the output unit 102, the control apparatus 100 is unable to specify to whom the user is referring using only the sentence "Who is this person?"

Therefore, the control apparatus 100 according to the present embodiment detects a gesture of the user that is performed together with the utterance. The control apparatus 100 according to the present embodiment detects the gesture of the user that is performed together with the utterance. Therefore, even when an ambiguous expression such as "Who is this person?" is uttered, a position of the utterance subject in content is decided. In the present embodiment, a case in which the user explicitly indicates a position is defined as a unique type and a case in which the user does not explicitly indicate a position is defined as a candidate type.

First, the case of the unique type will be described. For example, when a touch panel is provided in the output unit 102 and the user touches the touch panel using his or her finger, the control apparatus 100 can decide the touched location as a position of the utterance subject in the content. When the user designates a position without touching the touch panel, the control apparatus 100 detects a gesture of the user, and thus decides a position of the utterance subject in the content. The control apparatus 100 detects, for example, a position indicated by the user's finger or a line of sight of the user, and thus specifies a position of a part to which the user points.

In addition, the control apparatus 100 may output the detection result of the gesture of the user to the output unit 102. When the state transitions to the above-described utterance reception state, the control apparatus 100 displays a position indicated by the gesture of the user in the content and thus can feed the detected part indicated by the gesture of the user in the content back to the user.

Next, the case of the candidate type will be described. When the user does not explicitly indicate a position with respect to content, the control apparatus 100 queries the user about a position that the user indicates in the content. When the query is made, the control apparatus 100 queries the user in any mode of a real time mode in which the query is returned to the user in real time and a bookmark mode in which the query is returned to the user according to a content state, for example, after viewing of the content ends or during a commercial.

When a response is provided in the real time mode, the control apparatus 100 may pause the content and narrow down candidates for the user or may display a screenshot of the content from the moment at which the user produced the utterance on another screen in order not to interfere with the user's viewing of the content. In any case, the control apparatus 100 shows the user a screen that was output from the output unit 102 at the moment at which the user produced the utterance and allows the user to specify a position once again. When the user is allowed to specify the position once again, the control apparatus 100 can specify a position in the content.

When a response is provided in the bookmark mode, the control apparatus 100 maintains a screenshot of content from the moment at which the user produced the utterance, displays a screenshot at a predetermined timing, shows the user a screen that was output from the output unit 102, and allows the user to specify the position once again. By allowing the user to specify the position once again, the control apparatus 100 can specify the position in the content.

When the user does not designate a position in either mode, the control apparatus 100 may arbitrarily decide a position in the content that is assumed to be designated by the user. For example, if the fact that the user has a strong interest in female entertainers is found in preferences of the user, and the user asks the question "Who is this person?" in a scene in which a male and a female appear, the control apparatus 100 determines that the female is indicated rather than the male, and may specify a location of the female in the content.

If there are a plurality of possible candidates in content when the user utters a question, according to whether the user designates a position in the content, the candidates can be classified into the following pattern.

TABLE 1

(Classification when one candidate is decided from a plurality of candidates)

| Case | User designation | Method | User profile | Type | Presentation details |
|---|---|---|---|---|---|
| A-1 | o | Touch | x | Unique type | A screen that is reproduced or stopped is directly touched |
| B-1 | o | Utterance | x | Unique type | A candidate is designated using an utterance |
| B-2 | o | Gesture | x | Unique type | A candidate is designated using a fingertip or a line of sight |
| B-3 | o | User designation in cooperation with a device | x | Candidate type | A capture of a tagged screen is transmitted to a device) having a screen such as a tablet, and a user performs designation using the device at any timing |
| C-1 | x | Personal interest | o | Candidate type | Presentation is performed in favor of a user's interest (favorite entertainer) |
| C-2 | x | Feature extraction | o | Priority level Candidate | A candidate person who has close feature values (face, age, height, measuements, birthplace or the like) is shown |
| C-3 | x | Cooccurrence relation | o | Priority level candidate | Collaborative filtering A favorite entertainer of a user and an entertainer in whom the same user has an interest are connected in a cooccurrence relation, and preferentially presented in the order of a close cooccurrence relation |
| D-1 | x | Hierarchy | x | Priority level Candidate | Fixed type: in the case of a TV drama, a candidate is decided in the decided priority order of a leading role, a director, a producer, and a supporting role |

TABLE 1-continued (Classification when one candidate is decided from a plurality of candidates)

| Case | User designation | Method | User profile | Type | Presentation details |
|---|---|---|---|---|---|
| D-2 | x | Popularity | x | Priority level candidate | WEB information of, for example, an SNS or an EPG is analyzed and people of interest are shown in order (e.g., keyword frequency) |

The case of A-1 is a pattern in which the user is allowed to directly designate a position. The cases of B-1 and B-2 are patterns in which the user is allowed to designate a position using a gesture. The case of B-3 is a pattern in which the user is allowed to designate a position in a device different from a device through which the user views content. A method of selecting a separate device will be described below. The cases of C-1 to C-3 are patterns in which a user profile is used, and a system automatically sets a priority from a graph structure of a knowledge base system. A method of determining a priority will be described below. The cases of D-1 and D-2 are patterns in which a priority is set according to a hierarchy of a knowledge base system and big data analysis. A method of determining a priority will be described below.

When a position of the utterance subject in the content is decided in Step S102, the control apparatus 100 then extracts a feature value of the content (Step S103). A process of extracting a feature value of the content in Step S103 is performed by, for example, the content analysis unit 130.

In Step S103, as a process of extracting a feature value of the content, an image, voice, and text in the content are separated and a feature value according to the separated data is extracted. For example, an extracted feature value is converted into a keyword according to image analysis in the case of an image, voice is converted into text according to voice recognition, and a feature value may be obtained according to language analysis of text.

When the user utters a question including an ambiguous expression of "Who is this person?" or "Where is this?" with respect to the content, a feature value of the content is necessary to answer the question. In the present embodiment, with respect to the content from the moment at which the user's utterance is detected, (tagged) information assigned to the content in advance is defined as a static feature value and information obtained by analyzing an image or voice of the content is defined as a dynamic feature value.

The static feature value corresponds to information about a person or a location that is tagged to content in advance. Even though there is no information tagged to the content in advance, information may be managed in time series of the content based on information that the knowledge base system unit 160 maintains. For example, in a situation in which a person in a TV program is changed in time series, all information (for example, a position range in the content, and a name and an age of a person) about the person may be maintained in a content reproducing apparatus, only ID information for identifying content may be maintained in a content reproducing apparatus, and information about the person may be obtained by querying the knowledge base system unit 160.

The dynamic feature value corresponds to information that is obtained by analyzing an image or voice of content.

Here, the control apparatus 100 according to the present embodiment analyzes an image or voice of the content by returning a predetermined time from a time at which an utterance is detected using a technique of perception delay feedback.

In content in which a scene is changed over time such as a moving image, there is a time lag from when the user views the content until he or she produces an utterance. Therefore, the control apparatus 100 may include a mechanism in which a time at which the user thinks of a question and a time at which the user utters the question are synchronized.

There are individual differences in a time lag from when a human perceives a picture or sound until voice is produced. For example, the time lag changes according to age. Therefore, the control apparatus 100 can set a time lag from when a human perceives a picture or sound until the user produces voice to a constant value in advance in a static manner, and after the user who has produced an utterance is specified, can dynamically change the time lag based on user profile information. For example, when the fact that the user who has produced an utterance is a teenager can be determined based on user profile information, the time lag may set to be short. When the fact that the user who has produced an utterance is in his or her sixties can be determined based on user profile information, the time lag may set to be longer.

Then, the control apparatus 100 acquires content information for each frame from when an utterance of the user is detected before a previous time in consideration of the time lag. In this manner, when the time lag is set, the control apparatus 100 can feed back a perception delay of the user and can include content that the user is on focus in an analysis target of an image or voice.

When the feature value of the content is extracted in Step S103, the control apparatus 100 then performs a process of specifying a speaker who has produced an utterance (Step S104). The process of specifying a speaker in Step S104 is performed by the speaker recognition unit 140. The control apparatus 100 performs signal processing, image analysis, and speaker identification using data that is obtained by sensing of a camera sensor, a microphone sensor, and a depth sensor of a device configured to output content.

In order to specify an utterance direction, for example, a microphone array sensor is used. The control apparatus 100 can determine a direction in which an utterance is produced using a beamforming technology through which an utterance direction is specified by identifying a direction in which sound is produced according to a time delay when sound passes through a microphone array.

In order to specify an utterance direction, for example, a depth sensor or a camera sensor is also used. The control apparatus 100 can specify a direction of a gesture of the user detected by the depth sensor or the camera sensor as the utterance direction.

When the user's voice is identified, the control apparatus 100 specifies the utterance direction using, for example, the beamforming technology, then collects voice in that direction, and can identify the voice by comparison between a waveform of the collected voice and a waveform registered in the knowledge base system unit 160.

When a face of the user who has produced an utterance is identified, the control apparatus 100 specifies an utterance direction using, for example, the beamforming technology, then captures an image in that direction, performs a face detection process on the captured image to extract the face, and can identify the face by comparison with a face image registered in the knowledge base system unit 160.

The control apparatus 100 may display an icon in which a face or a name registered in the knowledge base system unit 160 in advance or a face image captured by a camera is displayed on a screen on which content is output. The 115 control apparatus 100 may allow the user to select the icon or the image and thus specify a speaker. Selection of the icon or the image by the user may be performed by direct designation using a touch panel or indirect designation using a gesture.

When the speaker who has produced an utterance is specified in Step S104, the control apparatus 100 then performs a speaker recognition feedback process (Step S105). The speaker recognition feedback process in Step S105 is performed by the output control unit 180.

The speaker recognition feedback process in Step S105 is a process in which reception of utterance recognition, an error, and a speaker specifying result is fed back to the user. The speaker recognition feedback process is performed, for example, as follows. The speaker recognition unit 140 provides parameters of reception of utterance recognition, an error, and a speaker specifying result to the response generation unit 170. The response generation unit 170 generates a response based on parameters received from the speaker recognition unit 140 and provides the generated response to the output control unit 180. The output control unit 180 immediately outputs the response received from the response generation unit 170 in a format in which the response is superimposed on content.

The control apparatus 100 may not necessarily perform the speaker recognition feedback process in Step S105. The control apparatus 100 determines whether the speaker recognition feedback process is performed based on settings of the user, and when the user requests the speaker recognition feedback process, may perform the speaker recognition feedback process. Alternatively, the control apparatus 100 may perform the speaker recognition feedback process only when it is not possible to recognize an utterance or it is not possible to specify a speaker.

When the speaker recognition feedback process in Step S105 is performed, the control apparatus 100 then performs a process of understanding an intention of the utterance sentence extracted in Step S101 (Step S106). The process of understanding an intention of the utterance sentence in Step S106 is performed by the utterance analysis unit 150 using the knowledge base system unit 160.

In the present embodiment, in order to understand an intention of the utterance sentence, the utterance analysis unit 150 uses knowledge (called a knowledge base) such as facts, common sense, or experience that is stored (structured) in a database in a format that can be understood by a computer. The knowledge base is not a simple database but includes a searching or reasoning mechanism for utilizing the stored knowledge. The knowledge base system unit 160 stores the knowledge base and includes the knowledge database 161 and the WEB information maintaining unit 162 shown in FIG. 5.

The knowledge database 161 includes a triple resource description framework (RDF) structure in which knowledge of each of "a subject, a predicate, and an object" is referred to as a node and connecting nodes are referred to as relations, and a knowledge graph structure connecting the triplets is built. An example of the triplets includes "Mount Fuji, altitude, and 3776 meters."

The database is broadly classified into general knowledge that is not dependent on the user such as world facts, common sense, and experience and user knowledge (a user profile) that is dependent on the user. In the present embodiment, in order for the control apparatus 100 to decide a device to which a response is output, device information is necessary. A device that the user holds is user knowledge. Characteristic information (for example, a size of a screen and whether or not it has a screen) of the device is general knowledge.

When the utterance analysis unit 150 searches knowledge stored in the knowledge base system unit 160 using an utterance sentence, it is necessary to support notation variability. In the case of voice recognition, it is necessary to consider differences in hiragana and katakana, differences in kanji, and differences in half-width and full-width without symbols. A case in which not all candidates in a database are read is assumed. The utterance analysis unit 150 dynamically changes a character string of the extracted utterance sentence, increases search candidates, and searches the knowledge base system unit 160. In order to dynamically change the character string of the utterance sentence, increase search candidates, and search the knowledge base system unit 160, it is preferable to define a conversion rule of a character string, define a character string that is converted according to a rule as a compression notation, and generate a compression notation in a database in advance. The utterance analysis unit 150 dynamically generates a compression notation from the character string of the utterance sentence, and performs comparison with a compression notation stored in the knowledge base system unit 160.

Since an amount of the knowledge database 161 is massive, in order to increase a processing rate, the utterance analysis unit 150 performs descending sorting according to, for example, a score value of data, and when the number of hits becomes a default value, may end the search process.

The utterance analysis unit 150 generates a compression notation according to a conversion rule of the compression notation shown in Table 2 from the notation of the utterance sentence. In addition, the knowledge database 161 is converted in advance using the same conversion rule of the compression notation.

TABLE 2

(Conversion rule of compression notation)

| Before compression | After compression |
| --- | --- |
| Half-width kana | Full-width kana |
| Full-width digits | Half-width digits |
| Full-width Roman letters | Half-width Roman letters |
| Half-width/full-width spaces | Delete |
| Symbol system<br>( ･ _ 、 __ 、 ー 、 =、 =<br>！、！、？、？、' 、<br>' , ” ) | Delete |
| Brackets | Delete pairs to<br>(、 (、 (、 「、 「、 [、 [、 [、<br>]、 )、 )、 」、 ＜、 ＜、 《、 ≪ |

The knowledge base system unit 160 may maintain a synonym database. The utterance analysis unit 150 deploys a synonym from the synonym database and thus can increase notation candidates.

The utterance analysis unit 150 interprets an ambiguous expression of the utterance sentence and determines a domain or a genre of a notation of the utterance. Since triple data of the RDF structure is published and the database does not have a unified format and scheme, the knowledge base system unit 160 uniquely defines a semantic attribute and maintains conditions for mapping attributes of databases.

Figure 9:
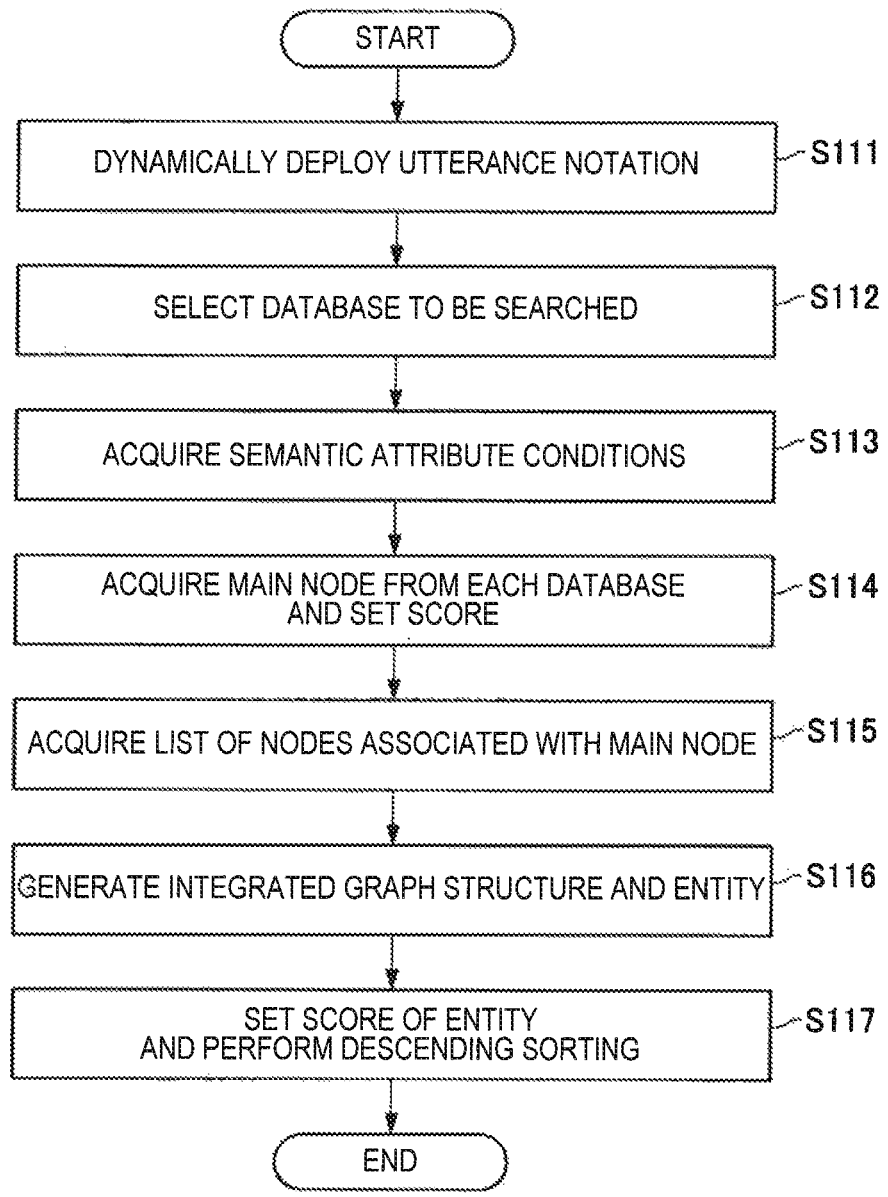
FIG. 9 is a flowchart showing an operation example of the utterance analysis unit 150.

FIG. 9 is a flowchart showing an operation example of the utterance analysis unit 150. FIG. 9 shows an operation example of the utterance analysis unit 150 when the knowledge base system unit 160 is searched based on details of the utterance sentence.

First, the utterance analysis unit 150 dynamically deploys a notation of an utterance sentence based on the conversion rule of Table 2 and generates a candidate of a search notation (Step S111). When the notation of the utterance sentence is dynamically deployed in Step S111, the utterance analysis unit 150 then selects a database to be searched according to parameters of a target language or the like (Step S112).

Figure 10:
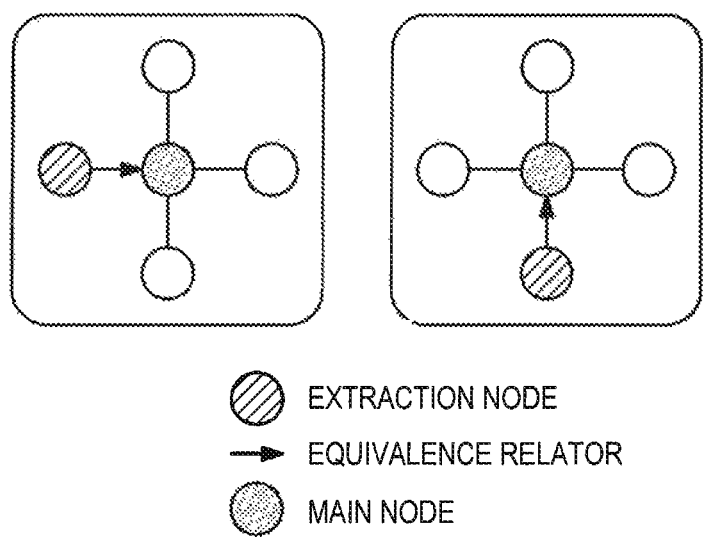
FIG. 10 is an explanatory diagram describing acquisition of a main node.

When the database to be searched is selected in Step S112, the utterance analysis unit 150 then acquires semantic attribute conditions, that is, conditions for determining a domain or a genre of a person, a place name, music and the like (Step S113). When the conditions for determining a domain or a genre are acquired in Step S113, the utterance analysis unit 150 then acquires a main node from each database and sets a score (Step S114). FIG. 10 is an explanatory diagram describing acquisition of a main node. The utterance analysis unit 150 finds an extraction node from a target language, a notation list, a search database list, and semantic attribute conditions. When the extraction node is found, the utterance analysis unit 150 traces an equivalence relator (predicate) from the extraction node and finds the main node. Then, the utterance analysis unit 150 acquires a score value of the found main node.

Figure 11:
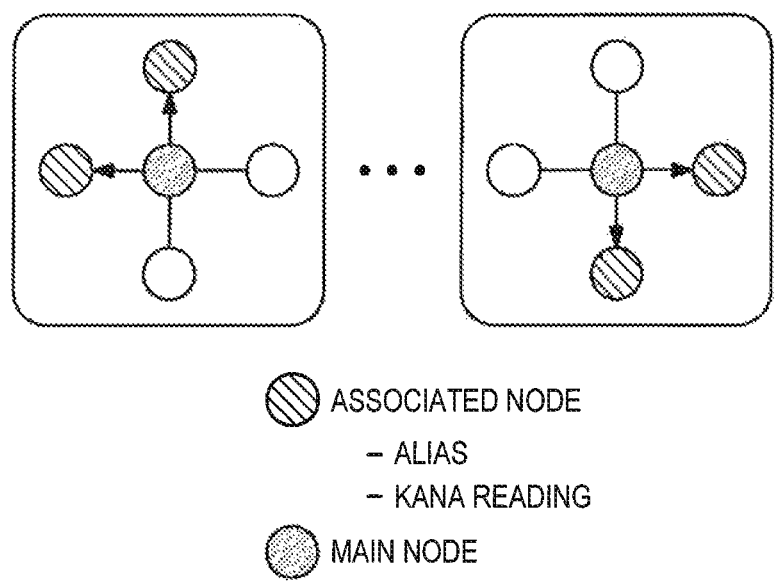
FIG. 11 is an explanatory diagram describing acquisition of a list of nodes associated with the main node.

When the main node is acquired and the score is set in Step S114, the utterance analysis unit 150 then acquires a list of nodes associated with the main node (Step S115). FIG. 11 is an explanatory diagram describing acquisition of a list of nodes associated with the main node. The utterance analysis unit 150 traces an equivalence relator from a main node of each database and extracts an associated node. The associated node is an abbreviated notation and a kana reading notation.

Figure 12:
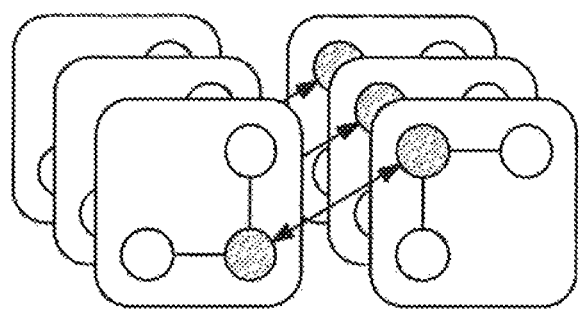
FIG. 12 is an explanatory diagram describing mapping of main nodes to each other.

When the list of nodes associated with the main node is acquired in Step S115, the utterance analysis unit 150 then maps main nodes of databases to each other (Step S116). FIG. 12 is an explanatory diagram describing mapping of main nodes to each other. The utterance analysis unit 150 calculates information about links between acquired main nodes from the associated node, generates links between main nodes, and connects databases.

Figure 13:
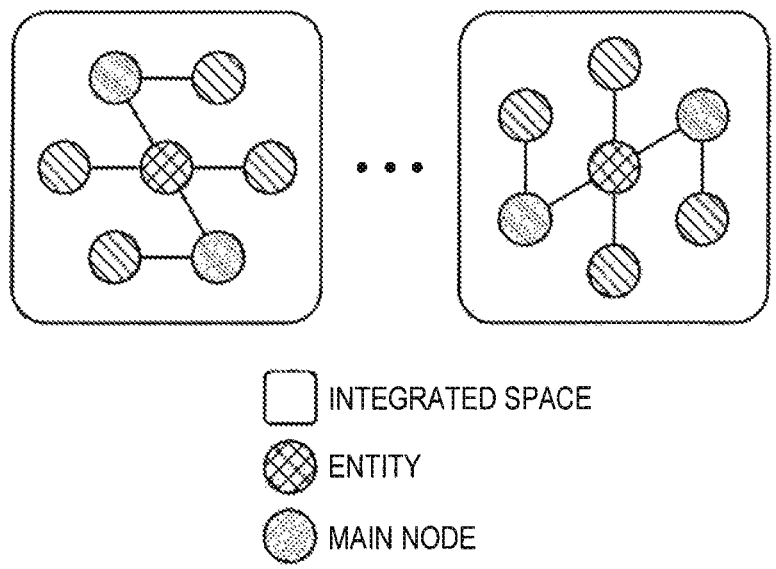
FIG. 13 is an explanatory diagram describing generation of an entity.

When main nodes of databases are mapped in Step S116, the utterance analysis unit 150 then generates an integrated graph structure and an entity (Step S117). A hierarchy is assumed to be set in each database. The utterance analysis unit 150 links databases in the hierarchy order and creates an integrated graph structure. Then, the utterance analysis unit 150 sets a main node of a database having the highest hierarchy as an entity. FIG. 13 is an explanatory diagram describing generation of an entity.

Figure 14:
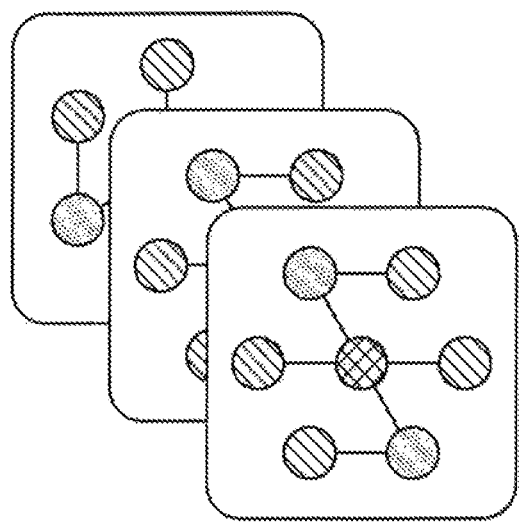
FIG. 14 is an explanatory diagram describing descending sorting of scores of entities.

When the integrated graph structure and the entity are generated in Step S117, the utterance analysis unit 150 then sets a score of the entity and performs descending sorting (Step S118). The utterance analysis unit 150 sets the highest score of a main node of each database as a score of an entity and performs descending sorting of scores of entities. FIG. 14 is an explanatory diagram describing descending sorting of scores of entities.

When the utterance analysis unit 150 performs a series of operations shown in FIG. 9, it is possible to search the knowledge base system unit 160 based on details of the utterance sentence and understand an intention of the utterance sentence.

FIG. 9 describes a specific example of a series of operations of the utterance analysis unit 150. For example, an operation example of the utterance analysis unit 150 when the user utters "How old is Acchan?" and a response "23 years old" is returned based on an analysis result from the utterance analysis unit 150 will be described.

First, the utterance analysis unit 150 generates various search terms by dynamically deploying a notation of the utterance sentence. When a notation of a voice recognition result is [at:ɛ$^i$aN], and a notation in the knowledge base system unit 160 is "Acchan," the utterance analysis unit 150 generates a search term not only for [at:ɛ$^i$aN] but also for "Acchan." In addition, when the notation of the voice recognition result includes a symbol, the utterance analysis unit 150 deletes the symbol and generates a search term.

Next, the utterance analysis unit 150 selects a database to be searched according to parameters of a target language and the like. Since Japanese is used as a target in this example, the utterance analysis unit 150 selects a database in which information is stored in Japanese.

Next, the utterance analysis unit 150 acquires semantic attribute conditions. For example, when a person reflected in content is a singer, the utterance analysis unit 150 sets a semantic attribute as "person:singer:"

Next, the utterance analysis unit 150 acquires a main node from the selected search target database and sets a score. Each database maintains triple data of a subject, a predicate and an object.

AA alias Acchan
AB alias Acchan
AA attribute person: singer
AB attribute person: entertainer
AA age 23 years old
AB age 32 years old "AA" and "AB" are personal names and correspond to main nodes. In addition, "Acchan" corresponds to an extraction node. The utterance analysis unit 150 first finds the extraction node of "Acchan," traces an alias, and can reach "AA" and "AB" that are main nodes. In this example, since there are two candidates, "AA" and "AB," it is not possible to uniquely decide the main node.

Next, the utterance analysis unit 150 acquires a list of nodes associated with the main node. The utterance analysis unit 150 acquires information indicating that the age is 23 years old and a semantic attribute is "person: singer" as information associated with the main node "AA." Similarly, the utterance analysis unit 150 acquires information indicating that the age is 32 years old and a semantic attribute is "person: entertainer" as information associated with the main node "AB."

Next, the utterance analysis unit 150 venerates an integrated graph structure and an entity. For example, when there are a plurality of search target databases and data of the main node "AA" is included in each database, the utterance analysis unit 150 collects the same main nodes as one and merges nodes associated with the main node.

Next, the utterance analysis unit 150 sets a score of the entity and performs descending sorting. In this example, "AA" and "AB" are generated as entities. Therefore, the utterance analysis unit 150 sets a score for determining a priority of the entity. The utterance analysis unit 150 calculates a score from a frequency of a node that accesses the database and WEB information (for example, the number of encyclopedia site views and a keyword frequency in an SNS) and performs sorting in descending order. In this example, since "person:singer" is derived from the state in content, the utterance analysis unit 150 can set "AA" as a candidate of the entity. On the other hand, when it is not possible to perform specification from the state in the content, the utterance analysis unit 150 performs sorting in the order of scores and may set an entity having the highest score as a candidate of the entity.

The utterance analysis unit 150 can decide an entity by performing such operations. Then, when the entity can be decided as "AA," the utterance analysis unit 150 traces age information from the entity and thus can generate a response "23 years old."

When understanding of an intention of the utterance sentence is performed in Step S106 of FIG. 8, the control apparatus 100 then generates response base parameters that are parameters serving as a base of the response (Step S107). The process of generating response base parameters in Step S107 is performed by the response generation unit 170.

Based on parameters obtained by the utterance analysis unit 150 searching the knowledge base system unit 160, the response generation unit 170 generates a response sentence, a response display, and response voice serving as a base.

In Step S107 of FIG. 8, when response base parameters that are parameters serving as a base of a response are generated, the control apparatus 100 then controls an output timing of the response (Step S108). Control of the output timing of the response in Step S108 is performed by the output control unit 180.

In the present embodiment, the control apparatus 100 controls a response timing according to a situation of content and a situation of the user who has tittered a question. The control apparatus 100 includes two modes, a real time mode and a bookmark mode, as a mode of an output timing of the response.

The real time mode is a mode in which a response is immediately returned while the user views content. In the real time mode, the user can immediately acquire information. The real time mode is based on a form in which a response is superimposed (overlaid) on a device through which the user views the content. The control apparatus 100 outputs a response without the user changing his or her gaze to another device and thus can present a response to the question uttered by the user without stopping a task on which the user is concentrating (that is, viewing the content).

When a response is output in the real time mode, the control apparatus 100 provides a result to a screen in which content is displayed. A display position of the response is decided in consideration of a positional relation between a device through which content is output and the user whose utterance is identified. For example, when there are people on the left and right sides of a device in which content is displayed and it is detected that a user on the left side has produced an utterance, the control apparatus 100 displays a response on the left side of the screen.

In order to emphasize a response when the response is output in the real time mode, the control apparatus 100 may perform emphasis by, for example, decreasing brightness of content that is output, blurring content with a shader or the like, and displaying a pop-up response. In addition, the control apparatus 100 may automatically pause content that is output and superimpose a response on the content. In order not to emphasize a response result, the control apparatus 100 pops up the result at the edge of the screen and thus does not interfere with the user's viewing of the content.

When a response is output in the real time mode, there is a possibility of outputting the response to a device capable of outputting only voice. When the response is output to a device capable of outputting only voice, in order for the user to easily listen to a response result, the control apparatus 100 decreases a volume of content that is output, sets it as background sound, and then may output a response superimposed on the background sound using voice.

On the other hand, the bookmark mode is a mode in which, in order to avoid interfering with the user's viewing of the content as much as possible, a response is maintained in a buffer, and an output timing is appropriately changed according to a situation of the user or a situation of the content. The bookmark mode is a mode in which a response is not immediately output unlike the above case but the response is output when predetermined conditions are satisfied.

When a response is output in the bookmark mode, the control apparatus 100 transmits a response to a device of the user who has uttered a question. It is possible to control an amount of information of the response according to a type of a device that the user uses. A relation between the device that the user uses and the amount of information of the response will be described below.

The control apparatus 100 can immediately transmit a response to a device of the user. When the response is immediately transmitted to a device of the user, the destination device may be a device that is registered in advance or may be a device that is frequently used by the user, which is determined from the usage history of the user. As a case in which a response is immediately transmitted to a device of the user, for example, a case in which the user manipulates a second device (a tablet or a PC) different from a device through which content is output while the user views the content is assumed. While the user views the content, a response is displayed on the second device. Therefore, when the user views the second device on which the response to the question is displayed at a preferred timing, it is possible to check the response to the question.

Alternatively, without immediately transmitting the response to the device of the user, the control apparatus 100 may recognize a face when the user views the second device and display the response on the second device based on the face recognition result.

In addition, the control apparatus 100 may transmit the response to the device held in the user's hand. When the response is transmitted to the device held in the user's hand, the control apparatus 100 maintains the response in the buffer, detects a timing at which the user holds the device and a timing at which the user manipulates the device, and transmits information from the buffer to the device. In addition, when the response is transmitted to the device held in the user's hand, the control apparatus 100 may detect a timing at which content ends and transmit the response at the timing.

When there are a plurality of users who view content, the control apparatus 100 may return the response to all of the users. In addition, even when there are not a plurality of users in front of the device on which the content is displayed, the control apparatus 100 may transmit the response to a device of a designated user. That is, even when a user (a user different from the user who is viewing) of a destination to which a response is returned is not in front of the device through which the content is output, the control apparatus 100 can return the response to a user that is interpreted in an utterance or a user who is set in advance. For example, when the user utters "Return the response to Dad," the control apparatus 100 can decide a destination to which the response is returned as a device that the user's father uses.

When the user is considered to be concentrating on the content, the control apparatus 100 may output a response according to a situation of the content without immediately returning the response. As an example of the situation of the content, the control apparatus 100 may return the response to a device that the user uses, for example, when the content reaches a predetermined timing (for example, when content transitions to an advertisement, after a program ends, and after reproduction ends in the case of music). When the response is returned at a predetermined timing of the content, the control apparatus 100 may overlay the response on a device through which the user views the content or may transmit the response to a device different from the device that the user uses and through which the user views the content.

The control apparatus 100 may transmit the response based on settings of an output timing of the response according to a situation of the content. The setting of the output timing of the response may include default settings registered in advance and user settings registered by the user. Table 3 shows examples of default settings and output timings set for each genre of the content determined in advance. The user settings are settings in which the user can register an output timing for each genre of the content.

TABLE 3

(Examples of default settings of response output timings)

| Genre | Output timing |
| --- | --- |
| Movie | End time |
| Drama | During advertisement |
| Concert | End time |
| Music | End time |
| Variety | Immediately |
| WEB browser | Immediately |

When the output timing of the response is controlled in Step S108 of FIG. 8, the control apparatus 100 then determines an interest level according to personalization (Step S109). Determination of the interest level according to personalization of Step S109 is performed when the output control unit 180 queries the knowledge base system unit 160.

Here, a process of the control apparatus 100 determining an interest level according to personalization will be described in detail. The control apparatus 100 may customize details of the response for each user and output the result. In order to customize details of the response for each user, the control apparatus 100 refers to personal information of the user (a user profile) stored in the knowledge base system unit 160. Table 4 shows an example of the user profile stored in the knowledge base system unit 160.

TABLE 4

(Example of user profile)

| ID | 123456789 |
| --- | --- |
| Family name | XX |
| Given name | YY |
| Nickname | XY |
| Sex | Male |
| Birthday | January 1 |
| Blood type | A |
| Birthplace | Yokohama, Kanagawa Prefecture |
| Age | 30 |

TABLE 4-continued (Example of user profile)

| Favorite sports | Tennis, snowboarding |
| --- | --- |
| Favorite entertainer | AA |
| Family | Link to ID of another person |
| Friend | Link to ID of another person |
| Colleague | Link to ID of another person |
| Action log | 2/10 Tokyo Tower |
| Hobbies | Tennis, snowboarding |
| Special skill | Cooking |
| Favorite spot | Shibuya |

In order to customize details of the response for each user, the control apparatus 100 determines an interest level of the user. In the present embodiment, the interest level of the user is divided into three levels. The high level corresponds to a personal interest, the intermediate level corresponds to feature extraction and a cooccurrence relation, and the low level has no correspondence. The control apparatus 100 traces an interest graph structure in order to determine an interest level of the user. The interest graph structure generates feature similarity profiles shown in Table 5 and associated user profiles shown in Table 6 in addition to the user profile (Table 4) maintained in the knowledge base system unit 160.

TABLE 5

(Examples of feature similarity profiles)

| Main target | Property | Associated target | Degree of similarity |
| --- | --- | --- | --- |
| AA | Face | BB | 0.8 |
| AA | Face | CC | 0.7 |
| AA | Face | DD | 0.6 |

TABLE 6

(Examples of associated user profiles)

| User name | Favorite entertainer in addition to AA |
| --- | --- |
| A | EE, FF |
| B | GG |
| C | HH, II |
| D | EE, JJ |

Figure 15:
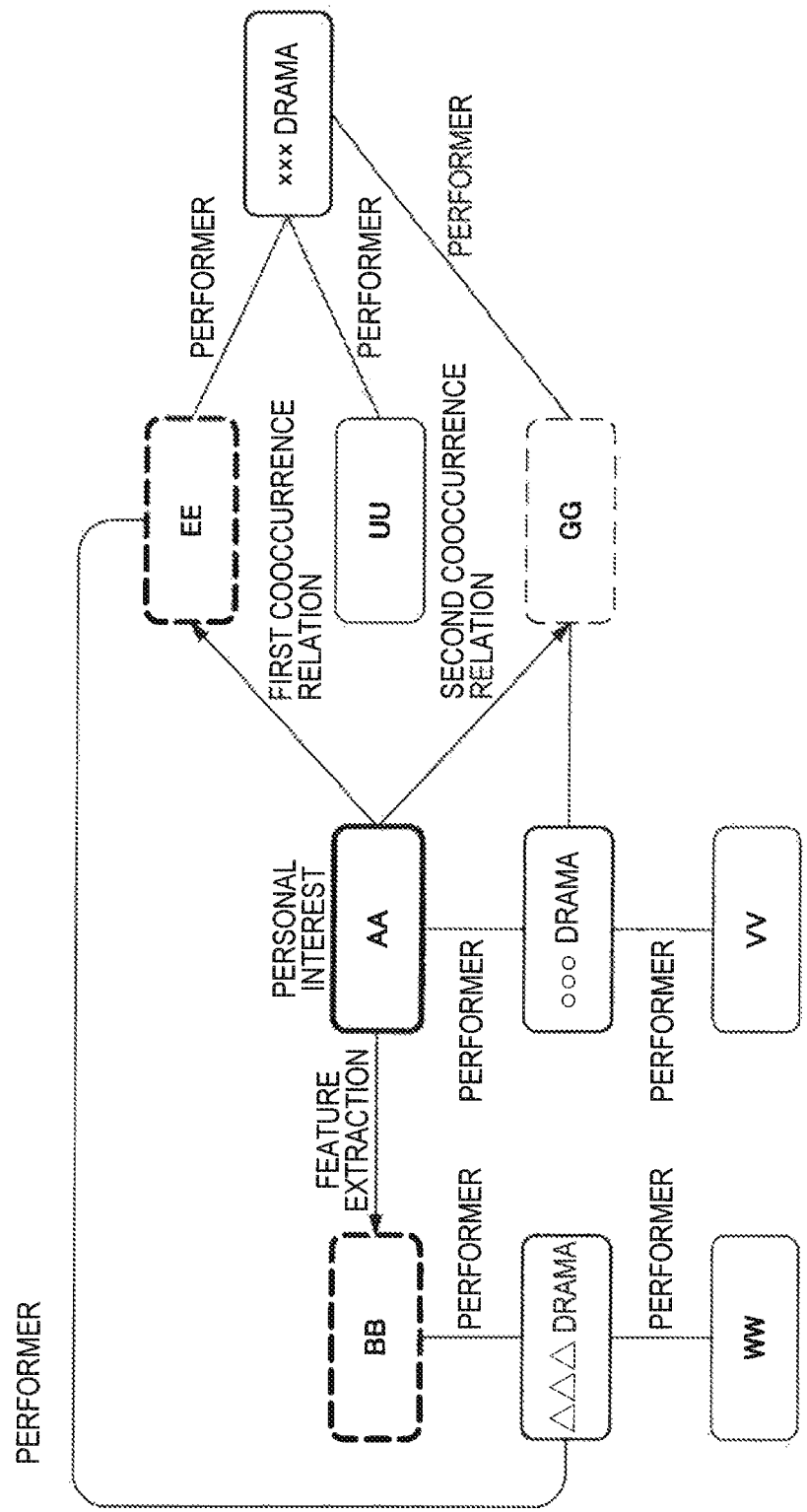
FIG. 15 is an explanatory diagram showing an example of an interest graph structure.

FIG. 15 is an explanatory diagram showing an example of an interest graph structure that can be generated from user profiles, feature similarity profiles, and associated user profiles maintained in the knowledge base system unit 160. Based on the interest graph structure shown in FIG. 15, the personal interest can be determined as "AA," feature extraction can be determined as "BB," and the cooccurrence relation can be determined as "EE." Then, the control apparatus 100 can determine the interest level based on matching with details of the response.

The control apparatus 100 may change a summary amount of details of the response according to the determined interest level of the user. For example, the control apparatus 100 changes a color, a shape, or the number of icons or changes a type or a pitch of sound when the sound is used for expression, and thus can present the high or low interest level to the user. Table 7 is an explanatory diagram showing an example of output displays according to the interest level.

TABLE 7

(Examples of output displays according to the interest level)

| Pattern | Interest level: low Summary amount: small | Interest level: intermediate Summary amount: intermediate | Interest level: high Summary amount: large |
|---|---|---|---|
| A: color | Blue | Green | Red |
| B: shape | ● | ■ | ★ |
| C: number | ★ | ★★ | ★★★ |

When the user utters "Who is this person?" if there are a plurality of candidates in content and the user does not designate a target, the control apparatus 100 may perform determination by setting a priority level. The control apparatus 100 traces an interest graph based on, for example, transaction rules shown in Table 8 and thus can generate lists of extraction priority levels shown in Table 9.

TABLE 8

(Examples of transaction rules)
Priority level

Personal
interest
Feature value
extraction
Cooccurrence
relation

TABLE 9

(Examples of lists of extraction priority levels)

| ooo drama | xxx drama | ΔΔΔ drama |
|---|---|---|
| AA | EE | BB |
| VV | GG | EE |
|  | UU | WW |

For example, when content that the user views is xxx drama, the control apparatus 100 can decide a priority level in the order of "EE," "GG," and "UU," perform matching with candidates in the content, and set priority levels for the candidates.

The control apparatus 100 maintains a priority of a triple predicate and may specify an entity (a subject) in the hierarchy order of the predicate. For example, when the content that the user views is a TV drama, the predicate may be determined in the order of leading role, director, producer, and supporting role. In addition, the control apparatus 100 acquires WEB information, hr example, from an SNS or an EPG, assumes that a higher frequency of an entity indicates higher attention and may specify the entity in the frequency order.

When the interest level is determined according to personalization in Step S109 of FIG. 8, the control apparatus 100 then performs optimization of an output according to a device to which the response is output (Step S110). The optimization of the output of Step S110 is performed by the output control unit 180.

A device profile in which a response method is described according to whether a device held by the user includes a display or according to a size of a display area is maintained in the knowledge base system unit 160. The device management unit 190 acquires a device profile from the knowledge base system unit 160. Then, the output control unit 180 performs optimization of the output based on the device profile acquired by the device management unit 190 from the knowledge base system unit 160. Table 10 is a table that shows examples of device profiles. The output control unit 180 can perform optimization of the output of the response according to features of an output destination device based on device profiles shown in Table 10.

TABLE 10

(Examples of device profiles)

| Device name | Display area | Amount of information | Type of information | Feedback | Recommended device |
|---|---|---|---|---|---|
| Headset | None | Minimum | Only voice | Voice of single word (within 8 seconds) Direct to a device whose display area is equal to or greater than intermediate size | Tablet |
| Eyewear | Small | Small | Voice Summary | Summary within single line (40 characters) Direct to a display device whose display area is equal to or greater than intermediate size | Tablet |
| Portable music player | Small | Small | Voice Summary | Summary within single line (40 characters) Direct to a display device whose display area is equal to or greater than an intermediate size | Tablet |
| Wristband | Small | Small | Voice Summary | Summary within single line (40 characters) Direct to a display device whose display area is equal to or greater than an intermediate size | Tablet |

TABLE 10-continued (Examples of device profiles)

| Device name | Display area | Amount of information | Type of information | Feedback | Recommended device |
|---|---|---|---|---|---|
| Smartphone | Intermediate | Intermediate | Voice Details | Display all information or direct to a display device whose display area is equal to or greater than a large size | None or tablet |
| Tablet | Large | Large | Voice Details | Display all information | None |
| Large screen display | Large | Large | Voice Details | Display all information | None |

The operation example of the control apparatus 100 according to an embodiment of the present disclosure has been described above with reference to FIG. 8. The control apparatus 100 according to an embodiment of the present disclosure performs a series of operations shown in FIG. 8, generates a response to an utterance from the user, and can output the generated response in an optimal form.

1.4. Use Case Example

Next, a use case example using the control apparatus 100 according to an embodiment of the present disclosure will be described.

(1) Feed Information on a Person Who has Produced an Utterance Back to a User

Figure 16:
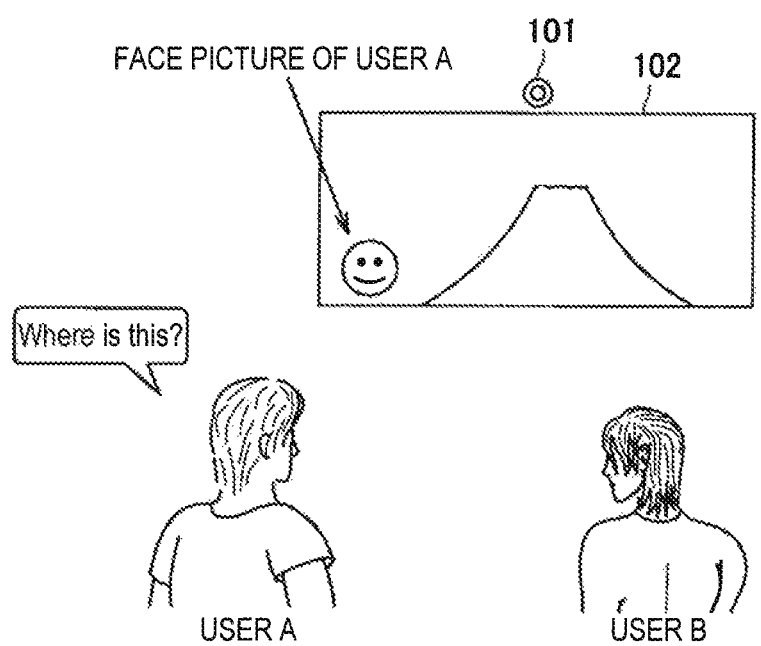
FIG. 16 is an explanatory diagram showing a use case example using the control apparatus 100 according to an embodiment of the present disclosure.

FIG. 16 is an explanatory diagram showing a use case example using the control apparatus 100 according to an embodiment of the present disclosure. The use case example shown in FIG. 16 is an example in which an image of a face of a user who has produced an utterance is captured using the camera provided as the input unit 101, and a display provided as the output unit 102 superimposes the face on content that is output. The use case shown in FIG. 16 is a case in which a user A utters "Where is this?" while viewing the content that is output through the display. In this case, the control apparatus 100 detects a location of the user A, captures an image of the user A using the camera, and superimposes the face of the user A on the content that is output through the display.

In addition, in the use case shown in FIG. 16, a face image may be superimposed on the side of the user who has produced the utterance. That is, when the user A on the left side of the display utters "Where is this?" the control apparatus 100 may display the face image of the user A on an area on the left side of the display.

Figure 17:
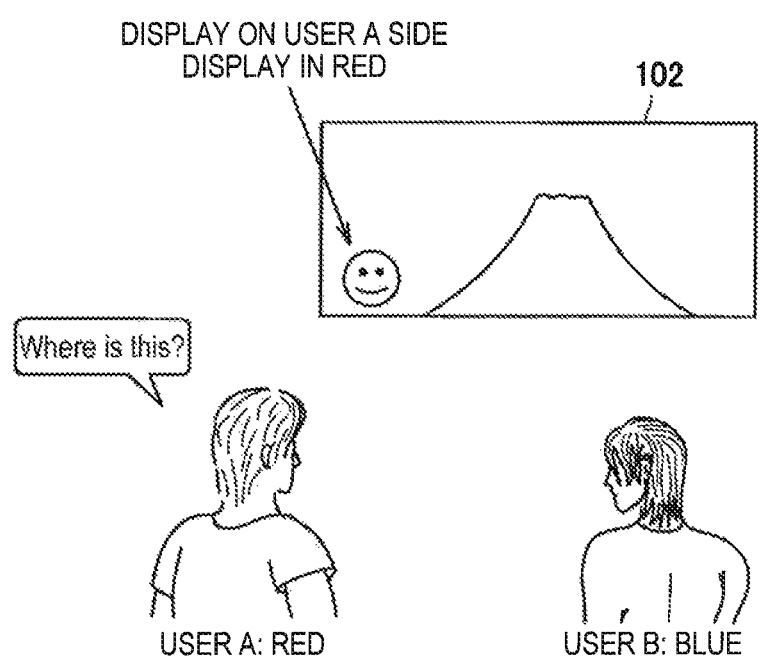
FIG. 17 is an explanatory diagram showing a use case example using the control apparatus 100 according to an embodiment of the present disclosure.

FIG. 17 is an explanatory diagram showing a use case example using the control apparatus 100 according to an embodiment of the present disclosure. The use case example shown in FIG. 17 is an example in which a display corresponding to the user who has produced an utterance is superimposed on content that is output through the output unit 102. The use case shown in FIG. 17 is a case in which the user A uttered "Where is this?" while viewing the content that is output through the output unit 102. In this case, the control apparatus 100 detects the user A who produced the utterance and superimposes an icon corresponding to the user A on the content that is output through the output unit 102. The control apparatus 100 may superimpose a color, a shape, or an avatar corresponding to the user A on the content that is output through the output unit 102 in addition to the icon.

In addition, in the use case shown in FIG. 17, an icon, an avatar or the like may be superimposed on the side of the user who has produced an utterance. That is, when the user A on the left side of the display utters "Where is this?" the control apparatus 100 may display an icon corresponding to the user A on an area on the left side of the display.

Figure 18:
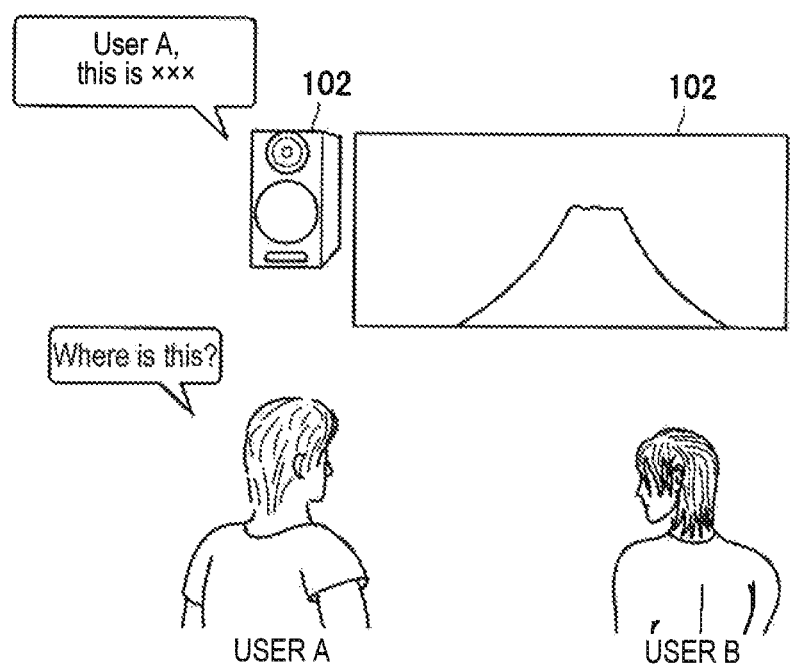
FIG. 18 is an explanatory diagram showing a use case example using the control apparatus 100 according to an embodiment of the present disclosure.

FIG. 18 is an explanatory diagram showing a use case example using the control apparatus 100 according to an embodiment of the present disclosure. The use case example shown in FIG. 18 is an example in which a voice response is returned to the user who has produced an utterance. The use case shown in FIG. 18 is a case in which the user A utters "Where is this?" while viewing content that is output through the output unit 102. In this case, the control apparatus 100 detects the user A who has produced the utterance and provides a voice response "User A, this is xxx."

(2) A Speaker is Specified and Information is Superimposed on Content

Figure 19:
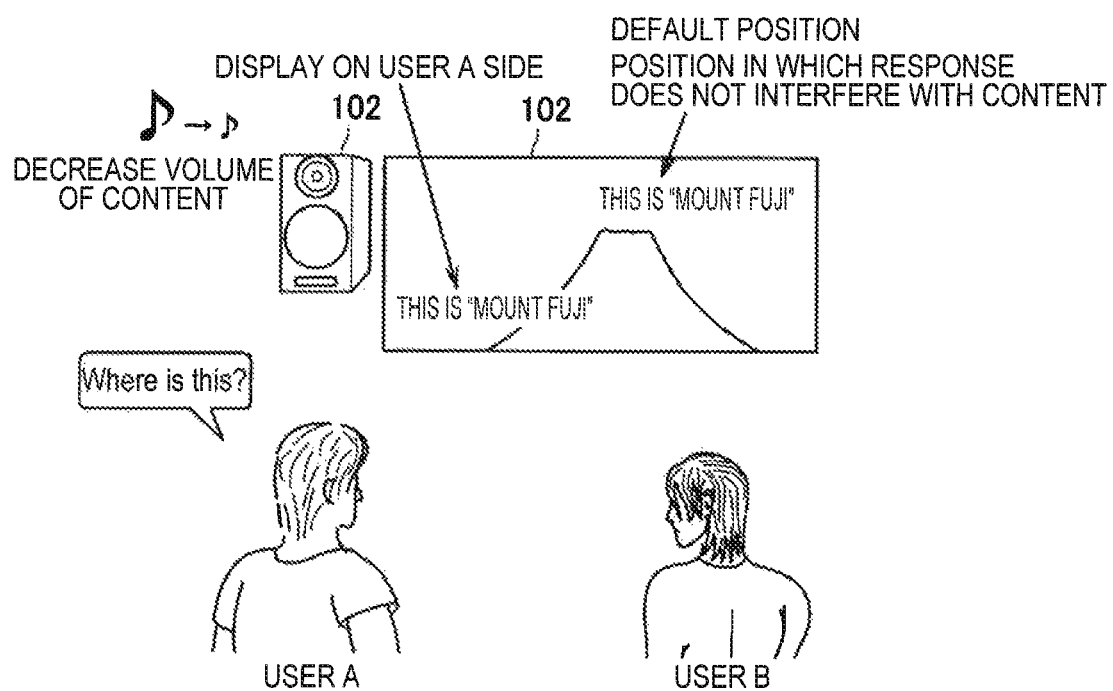
FIG. 19 is an explanatory diagram showing a use case example using the control apparatus 100 according to an embodiment of the present disclosure.

FIG. 19 is an explanatory diagram showing a use case example using the control apparatus 100 according to an embodiment of the present disclosure. The use case example shown in FIG. 19 is an example in which a speaker who has produced an utterance is specified and a response to the utterance is superimposed on content.

The control apparatus 100 may display a response to the utterance at a default position that is always fixed, and may display a response to the utterance by dynamically changing a display position according to a position of a speaker. In addition, the control apparatus 100 analyzes details of the content and may display a response to the utterance at a position at which it does not interfere with the content. In addition, when a voice response to the utterance is output, the control apparatus 100 may decrease a volume of the content that is output. In addition, when a response to the utterance is output, the control apparatus 100 may pause the content when the utterance is detected.

As a trigger when information is superimposed on content while the user views the content, the control apparatus 100 may use a time immediately after the utterance, during an advertisement, and a time after a program or music ends.

Figure 20:
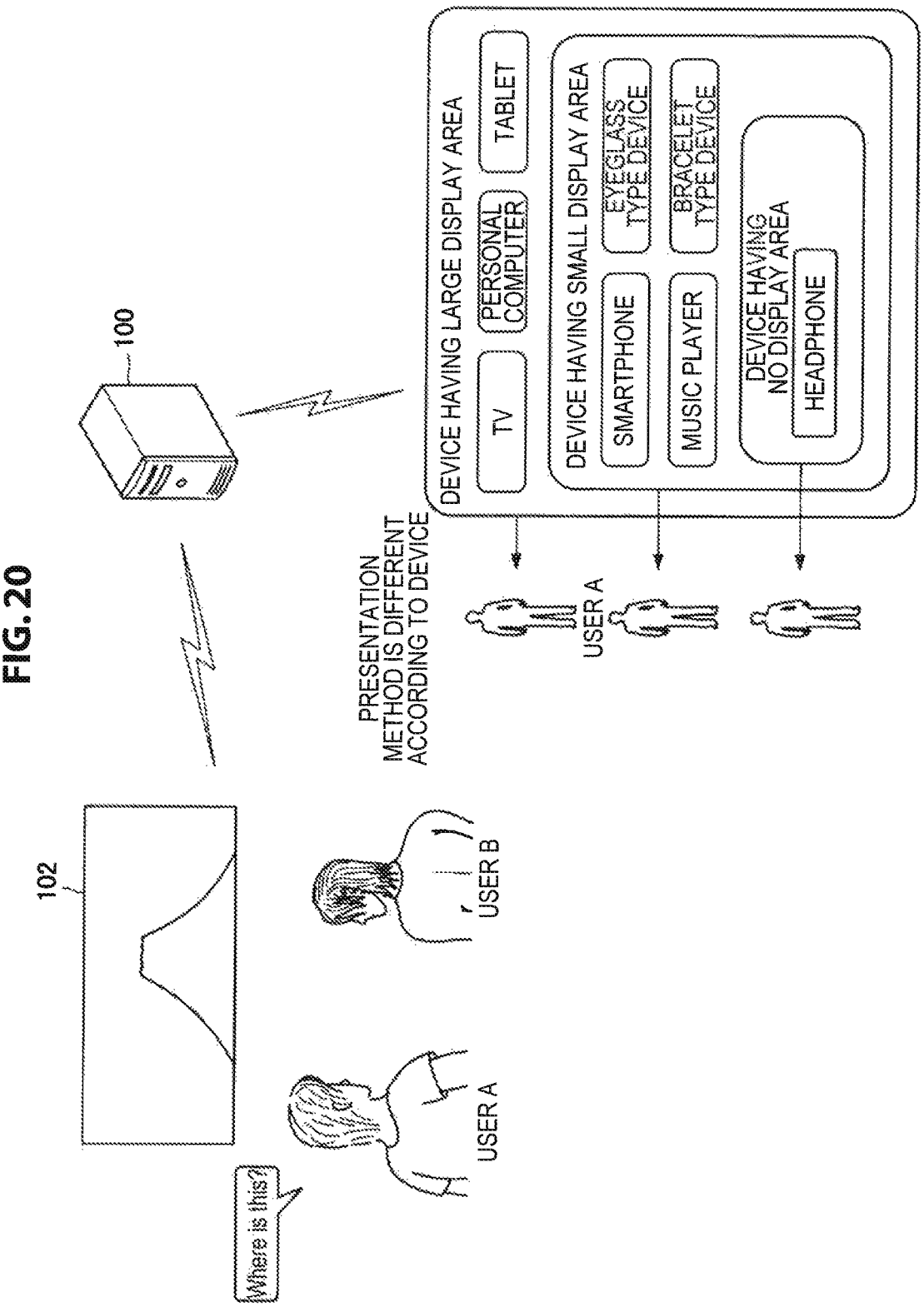
FIG. 20 is an explanatory diagram showing a use case example using the control apparatus 100 according to an embodiment of the present disclosure.

(3) A Speaker is Specified and Information is Transmitted to Another Device of the Speaker FIG. 20 is an explanatory diagram showing a use case example using the control apparatus 100 according to an embodiment of the present disclosure. The use case example shown in FIG. 20 is an example in which a speaker who has produced an utterance is specified and a response to the utterance is transmitted to another device held by the speaker.

When a speaker is specified and information is transmitted to another device of the speaker, the control apparatus 100 may transmit the information to a device that is determined in advance, a device held in the speaker's hand, or a device that is dynamically designated by the speaker. When the information is transmitted to another device of the speaker, the control apparatus 100 may additionally notify another device (for example, a device through which the user views content) of the fact that a response is transmitted to the device.

Figure 21:
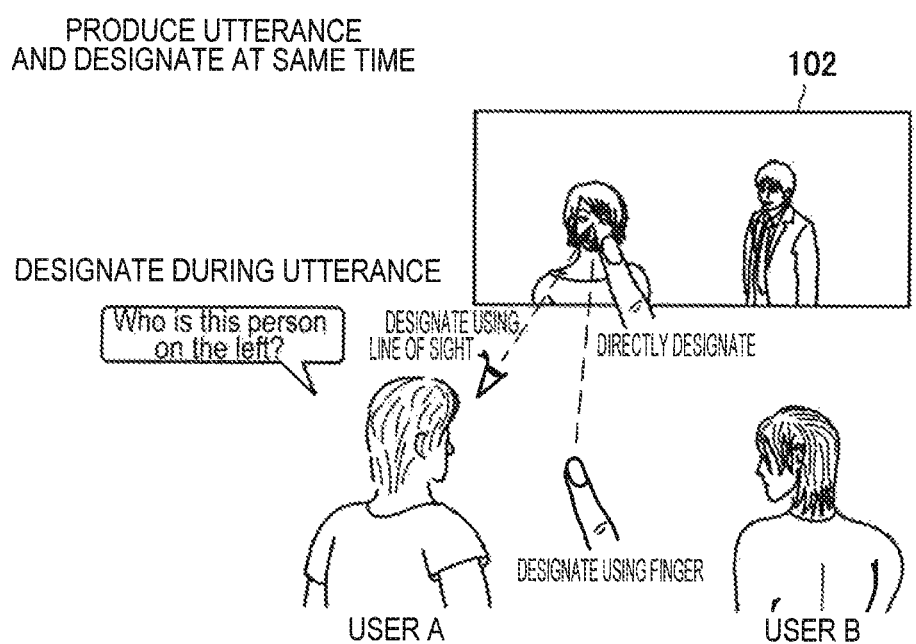
FIG. 21 is an explanatory diagram showing a use case example using the control apparatus 100 according to an embodiment of the present disclosure.

(4) A Speaker Performs Designation with Respect to a Plurality of Candidates in Content FIG. 21 is an explanatory diagram showing a use case example using the control apparatus 100 according to an embodiment of the present disclosure. The use case example shown in FIG. 21 is an example in which a speaker performs designation with respect to a plurality of candidates in content and is an example in which a speaker produces an utterance and designates a candidate at the same time.

When a speaker explicitly performs designation in the middle of an utterance sentence such as "Who is this person on the left?" and designates a candidate using a gesture or by touching a screen, the control apparatus 100 can generate a response for the candidate designated by the speaker and output the generated response.

Figure 22:
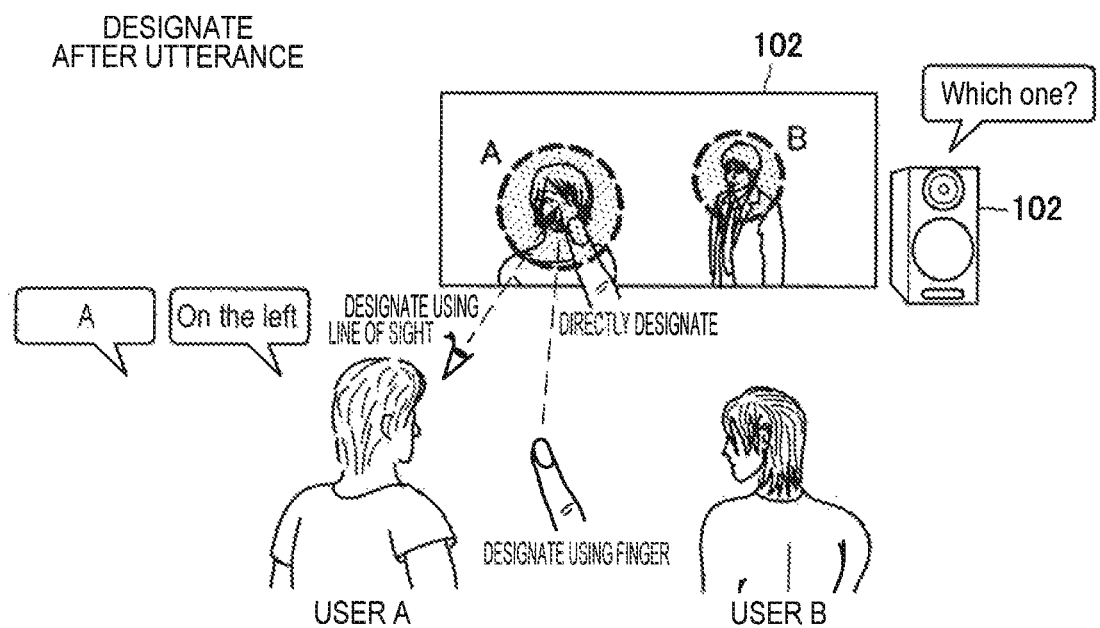
FIG. 22 is an explanatory diagram showing a use case example using the control apparatus 100 according to an embodiment of the present disclosure.

FIG. 22 is an explanatory diagram showing a use case example using the control apparatus 100 according to an embodiment of the present disclosure. The use case example shown in FIG. 22 is an example in which a speaker performs designation with respect to a plurality of candidates in content and is an example when a speaker designates a candidate after he or she produces an utterance.

If a plurality of people are included in content and a speaker utters "Who is this person?" but does not explicitly designate a candidate using an additional gesture, for example, as shown in FIG. 22, the control apparatus 100 conversely asks the speaker to whom the speaker is referring. Then, when the speaker performs designation by uttering "A" or "on the left," performs direct designation by touching a screen, or performs indirect designation using a gesture such as movement of a finger or a line of sight, the control apparatus 100 generates a response based on the designation and can output the generated response.

Figure 23:
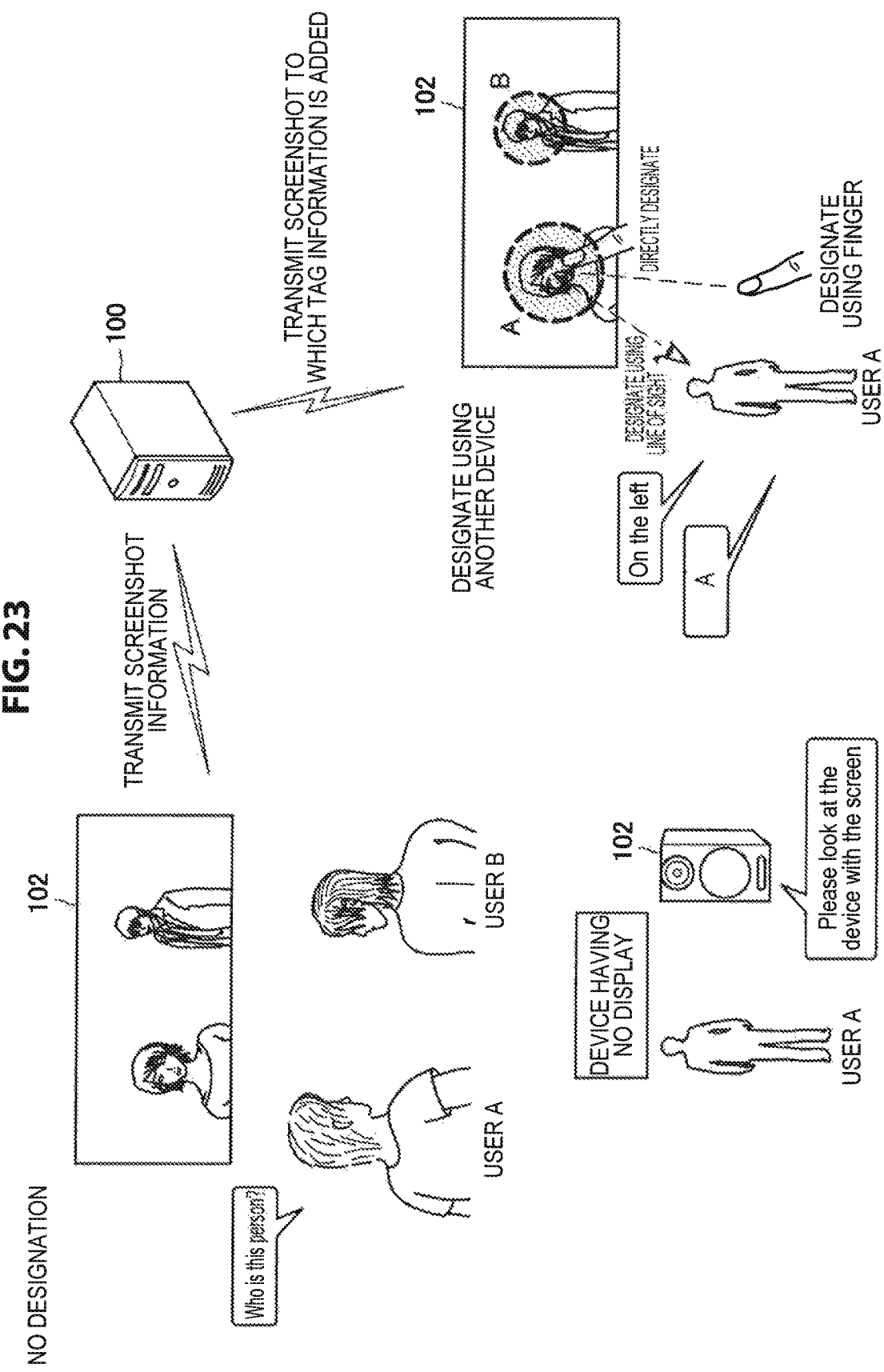
FIG. 23 is an explanatory diagram showing a use case example using the control apparatus 100 according to an embodiment of the present disclosure.

FIG. 23 is an explanatory diagram showing a use case example using the control apparatus 100 according to an embodiment of the present disclosure. The use case example shown in FIG. 23 is an example in which a speaker performs designation with respect to a plurality of candidates in content and is an example in which a screenshot of the content from the moment at which a speaker produces an utterance is maintained in the control apparatus 100 and then the speaker designates a candidate.

If a plurality of people are included in content and a speaker utters "Who is this person?" but does not explicitly designate a candidate using an additional gesture, for example, as shown in FIG. 23, the control apparatus 100 maintains a screenshot of the content from the moment at which the speaker produced the utterance, then presents the screenshot to a device of the speaker and may allow him or her to designate a person who is indicated. In addition, when the device held by the speaker has no display, the control apparatus 100 outputs voice such as "Please look at the device with the screen," and prompts him or her to use a device having a display.

(5) A Case in Which a Plurality of Candidates are Included in Content and a Control Apparatus Performs Determination.

FIG. 24 is an explanatory diagram showing a use case example using the control apparatus 100 according to an embodiment of the present disclosure. The use case example shown in FIG. 24 is an example in which there are a plurality of candidates in content from the moment at which the user produces an utterance, and the control apparatus 100 determines a priority level and outputs a response.

If a plurality of people are included in content and a speaker utters "Who is this person?" but does not explicitly designate a candidate using an additional gesture, for example, as shown in FIG. 24, the control apparatus 100 may output a response of possible candidates with priority levels. In the example shown in FIG. 24, when two people appear in the content and the speaker does not explicitly designate a candidate, the control apparatus 100 outputs information about two people as a response.

After the control apparatus 100 outputs information about two people who appear in the content as a response, when the user produces an utterance for designation, or performs direct designation by touching a screen, or indirect designation using a gesture such as movement of a finger or a line of sight, the control apparatus 100 generates a response again based on the designation and can output the generated response.

(6) When There are a Plurality of Users Who View Content

When there are a plurality of users who view content, the control apparatus 100 may specify a speaker and then output a response to the speaker or may output a response to all of the users who view the content without specifying the speaker. A case in which the speaker is not specified includes a case in which the control apparatus 100 is set in a mode in which a speaker is not specified and a case in which the control apparatus 100 is not able to specify a speaker.

In addition, when there are a plurality of users who view the content, the control apparatus 100 may specify a speaker and change a transmission destination according to details of an utterance. When a transmission destination is included in details of an utterance of the user A, for example, the utterance "Transmit to a user B," the control apparatus 100 may change the transmission destination of the response from the user A to the user B.

(7) Amount of Information of a Response

When a response is output, the control apparatus 100 may always output the response with the same amount of information, or change an amount of information based on an interest of the user who has produced an utterance. When the amount of information is changed based on an interest of the user who has produced an utterance, the control apparatus 100 may display a color or a symbol which indicates the extent of the amount of information, and change a type or a pitch of sound.

(8) Output of Supplementary Information

When a response is output, the control apparatus 100 may additionally output supplementary information. The supplementary information includes extensive knowledge and information associated with the user. For example, when an age of an entertainer is known to be the same as that of a mother of the user from a user profile, the control apparatus 100 may output information such as "The entertainer and your mother are the same age," as the supplementary information.

2. Hardware Configuration Example

Figure 25:
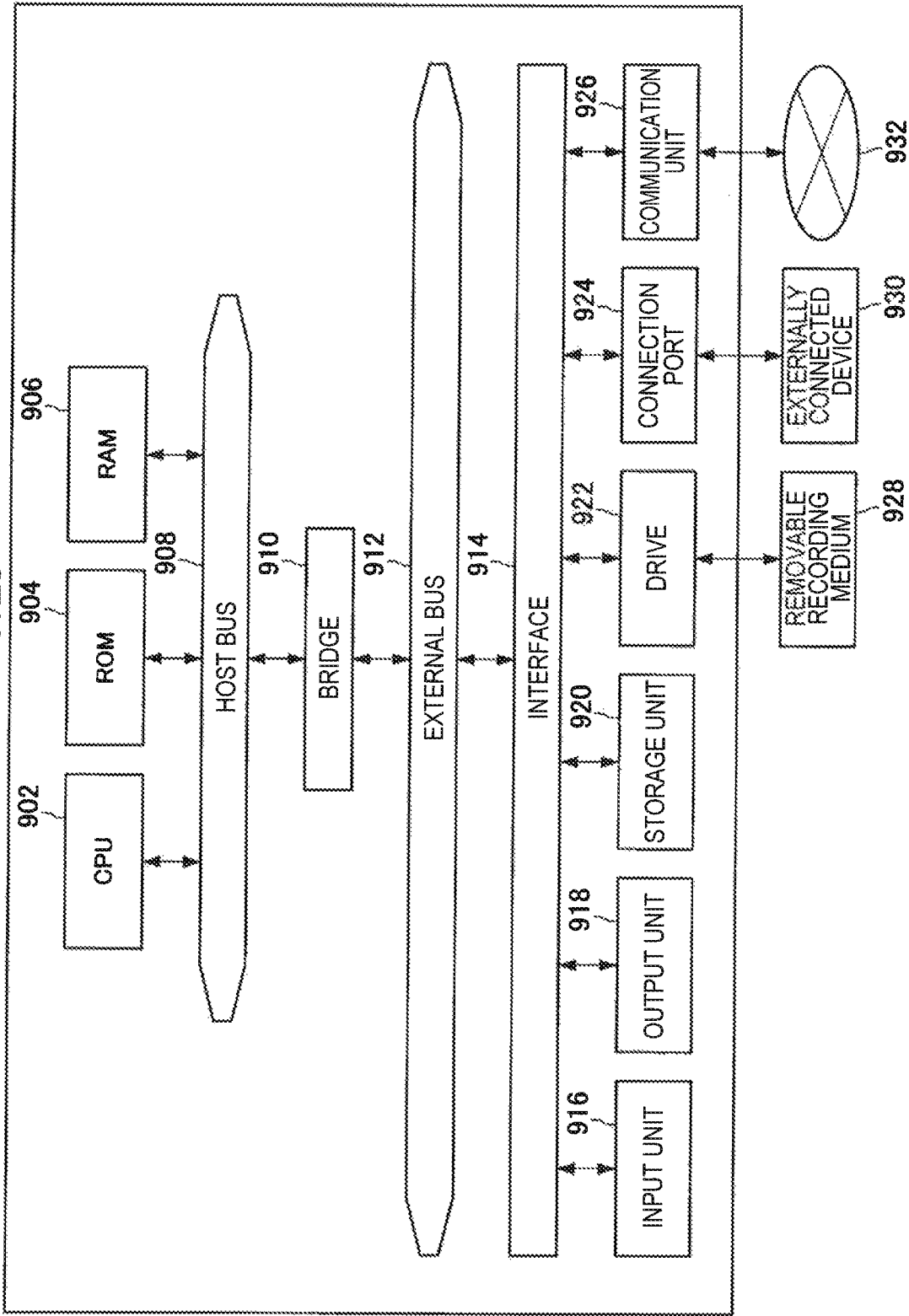
FIG. 25 is an explanatory diagram showing a hardware configuration example.

Next, a hardware configuration of the control apparatus 100 according to an embodiment of the present disclosure will be described with reference to FIG. 25. FIG. 25 is a block diagram illustrating a hardware configuration example of the control apparatus 100 according to the embodiment of the present disclosure. Each of the algorithms described above can be performed by using, for example, the hardware configuration of the information processing apparatus shown in FIG. 25. That is, the processing of each of the algorithms can be realized by controlling the hardware shown in FIG. 25 using a computer program.

Note that the mode of this hardware shown in FIG. 25 is arbitrary, and may be, for example, a personal computer, a mobile information terminal such as a mobile phone, a PHS or a PDA, a game machine, a contact or non-contact IC chip, a contact or non-contact IC card, a loud speaker, a television set, a monitor, a wearable device, or various types of information appliances. Moreover, the PHS is an abbreviation for Personal Handy-phone System. Also, the PDA is an abbreviation for Personal Digital Assistant.

As shown in FIG. 25, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element based on various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The FIDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

3. Summary

As described above, according to an embodiment of the present disclosure, the control apparatus 100 capable of detecting an utterance from the user who views content, analyzing details of the utterance, and outputting a response to the utterance in a form appropriate for the user is provided.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they naturally come under the technical scope of the present disclosure.

Note that the effects described above are not necessarily limitative. With or in the place of the above effects, there may be achieved any one of the effects described in this specification or other effects that may be grasped from this specification.

Additionally, the present technology may also be configured as below.

(1)

A control apparatus including:

a control unit configured to perform control such that details of a response generated for a query about content that is output to at least one user from the user and the response, a target to which the response is output and a target to which a timing at which the response is output is output are decided.

(2)

The control apparatus according to (1), wherein, as a timing at which the response is output, the control unit decides whether to output the response according to the query from the user or to wait to output the response in spite of the query from the user until a predetermined condition is satisfied.

(3)

The control apparatus according to (2), wherein the control unit waits to output the response in spite of the query from the user until a situation of the content satisfies a predetermined condition.

(4)

The control apparatus according to (2), wherein the control unit decides a timing at which the response is output according to a genre of the content when the response is provided to the user.

(5)

The control apparatus according to (2), wherein, when the control unit waits to output the response in spite of the query from the user until the predetermined condition is satisfied, the control unit outputs a response to an apparatus different from an apparatus to which the content is output.

(6)

The control apparatus according to (5), wherein, when the control unit waits to output the response in spite of the query from the user until the predetermined condition is satisfied, the control unit outputs a fact that there is a response to the apparatus different from the apparatus to which the content is output.)

(7)

The control apparatus according to any of (2) to (6), wherein the predetermined condition includes a condition that a predetermined timing of the content arrive.

(8)

The control apparatus according to (7), wherein the predetermined timing is a timing at which the content ends.

(9)

The control apparatus according to (7), wherein the predetermined timing is a timing at which the content transitions to a commercial.

(10)

The control apparatus according to any of (2) to (6), wherein the predetermined condition includes a condition that a predetermined time arrive.

(11)

The control apparatus according to any of (1) to (11), wherein the control unit decides the details of the response according to an interest level of the user who has made the query.

(12)

The control apparatus according to wherein the control unit decides the interest level of the user who has made the query, based on a personal profile of the user.

(13)

The control apparatus according to (11), wherein the control unit outputs a display corresponding to the interest level of the user together with the response.

(14)

The control apparatus according to any of (1) to (13), wherein the control unit outputs the response to an apparatus held in a hand of the user.

(15)

The control apparatus according to (14), wherein the control unit outputs the response to the apparatus held in the hand of the user when an output of the content ends.

(16)

The control apparatus according to any of (1) to (15), wherein, when a plurality of users who view the content are detected, the control unit detects the user who has made the query and outputs the response to the detected user.

(17)

The control apparatus according to (16), wherein the control unit detects the user who has made the query by detecting a direction in which the query has been made, and outputs the response to the detected user.

(18)

The control apparatus according to any of (1) to (17), wherein, when a plurality of users who view the content are detected, the control unit outputs the response to all the users.

(19)

A control method including:

performing, by a computer, control such that details of a response generated for a query about content that is output to at least one user from the user, a target to which the response is output and a timing at which the response is output are decided.

(20)

A computer program causing a computer to perform control such that details of a response generated for a query about content that is output to at least one user from the user, a target to which the response is output and a timing at which the response is output are decided.

REFERENCE SIGNS LIST 100 control apparatus
101 input unit
102 output unit
103 communication unit
104 control unit
110 utterance detection unit
111 signal processing unit
112 utterance reception processing unit
113 voice recognition unit
120 gesture detection unit
130 content analysis unit 140 speaker recognition unit
141 beamforming processing unit
142 speaker identification processing unit
150 utterance analysis unit
151 language analysis unit
152 semantic analysis unit
160 knowledge base system unit
161 knowledge database
162 WEB information maintaining unit
170 response generation unit
180 output control unit
181 trigger determination unit
182 personalized output unit
190 device management unit
191 sensor information acquisition unit
192 output device selection unit

The invention claimed is:

1. An information processing apparatus comprising:
  circuitry configured to:
    initiate output of content on a screen;
    receive, during the outputting of the content, an input of a user of a question including an ambiguous expression;
    maintain a screenshot of the content from a time at which the question is input;
    transmit input information about the question;
    receive response information after semantic details of the question including the ambiguous expression are estimated based on situation information at an input time of the question and the response information is generated; and
    initiate, in a bookmark mode, output of the response information on the screen when a predetermined condition is satisfied, the predetermined condition including a condition that the user is recognized and a condition that a predetermined time arrives.

2. The information processing apparatus according to claim 1,
  wherein the ambiguous expression is an expression including a demonstrative.

3. The information processing apparatus according to claim 1,
  wherein the predetermined time includes a timing at which the content ends.

4. The information processing apparatus according to claim 1,
  wherein the situation information includes specification of a questioner of the question including the ambiguous expression.

5. The information processing apparatus according to claim 4,
  wherein the situation information includes a preference or an attribute of the questioner based on the specification of the questioner.

6. The information processing apparatus according to claim 5,
  wherein the circuitry is further configured to:
  change an output form of the response information based on the preference or the attribute of the questioner.

7. The information processing apparatus according to claim 1,
  wherein the situation information is obtained from at least any one of a microphone, a camera, or a sensor at the input time.

8. The information processing apparatus according to claim 1,
  wherein the circuitry is further configured to:
    receive as the response information, when semantic details of the ambiguous question are unable to be estimated, a question with respect to the screenshot for clarifying the semantic details of the ambiguous expression, and then specify the semantic details in the screenshot based on an answer to the question with respect to the screenshot for clarifying the semantic details of the ambiguous expression; and
    initiate display of the screenshot at the predetermined time.

9. The information processing apparatus according to claim 1,
  wherein, when the response information is output using voice, the circuitry is further configured to:
  stop an output of voice of content that is separately output or decreases a volume.

10. The information processing apparatus according to claim 1,
  wherein the circuitry is further configured to:
    initiate output of the response information to another device.

11. The information processing apparatus according to claim 10,
  wherein, when the response information is output to the another device, the circuitry is further configured to:
  change an output form according to the another device, to which the response information is output.

12. The information processing apparatus according to claim 10,
  wherein, when the response information is output to the another device, the circuitry is further configured to:
  change an output amount according to the another device, to which the response information is output.

13. The information processing apparatus according to claim 1,
  wherein, when a plurality of candidates are included in the response information, the circuitry is further configured to:
    receive the plurality of candidates; and
    initiate output of the plurality of candidates.

14. The information processing apparatus according to claim 13,
  wherein circuitry is further configured to:
    receive the response information together with a score of each of the candidates; and
    initiate output of the plurality of candidates based on the score.

15. The information processing apparatus according to claim 1,
  wherein the circuitry is further configured to:
    maintain a screenshot of the content from a time at which the question is input; and
    initiate, in a real time mode, output of the screenshot on another screen different than the screen.

16. The information processing apparatus according to claim 8,
  wherein, the circuitry is further configured to:
    receive, after receiving the question for clarifying the semantic details of the ambiguous expression, an input of the answer to the question with respect to the screenshot for clarifying the semantic details of the ambiguous expression.

17. The information processing apparatus according to claim 1,
  wherein the condition that the user is recognized includes recognizing that the user manipulates the information processing apparatus.

18. The information processing apparatus according to claim 1, wherein the condition that the user is recognized includes recognizing a face of the user when the user views the screen.

19. The information processing apparatus according to claim 8,
wherein the predetermined time includes a timing at which the content transitions to a commercial.

20. An information processing apparatus comprising:
circuitry configured to:
   initiate output of content on a screen;
   receive, during the outputting of the content, information about a question including an ambiguous expression input of a user from a terminal;
   maintain a screenshot of the content from a time at which the question is input;
   estimate semantic details of the question including the ambiguous expression based on situation information at a time of input and generate response information;
   transmit the response information; and
   initiate, in a bookmark mode, output of the response information on the screen when a predetermined condition is satisfied, the predetermined condition including a condition that the user is recognized and a condition that a predetermined time arrives.

21. The information processing apparatus according to claim 20,
wherein the ambiguous expression is an expression including a demonstrative.

22. An information processing method comprising:
outputting content on a screen;
receiving, during the outputting of the content, an input of a user of a question including an ambiguous expression;
maintaining a screenshot of the content from a time at which the question is input;
transmitting input information about the question;
receiving response information after semantic details of the question including the ambiguous expression are estimated based on situation information at an input time of the question and the response information is generated; and
initiating, in a bookmark mode, output of the response information on the screen when a predetermined condition is satisfied, the predetermined condition including a condition that the user is recognized and a condition that a predetermined time arrives.

23. An information processing method comprising:
outputting content on a screen;
receiving, during the outputting of the content, information about a question including an ambiguous expression input of a user from a terminal;
maintaining a screenshot of the content from a time at which the question is input;
estimating semantic details of the question including the ambiguous expression based on situation information at a time of input and generating response information;
transmitting the response information; and
initiating, in a bookmark mode, output of the response information on the screen when a predetermined condition is satisfied, the predetermined condition including a condition that the user is recognized and a condition that a predetermined time arrives.

* * * * *